United States Patent

Scherer et al.

[15] 3,638,406
[45] Feb. 1, 1972

[54] FIELD CHOPPING MACHINE ATTACHABLE TO A TRACTOR

[72] Inventors: Lorenz Scherer, Oberelchingen; Heinrich Bellan, Thalfingen; Rudolf Wohrle, Rieden; Alfred Eggenmuller, Ulm, all of Germany

[73] Assignee: Gebruder Eberhardt, Ulm, Germany

[22] Filed: July 24, 1968

[21] Appl. No.: 747,285

[30] Foreign Application Priority Data

July 26, 1967 Germany..............................E 25545

[52] U.S. Cl...................................56/14.9, 56/2, 56/13.5, 56/14.3, 56/14.5, 56/15.5, 56/15.6, 56/DIG. 9
[51] Int. Cl. ..............................................A01d 45/02
[58] Field of Search......................56/15, 16, 60, 61, 27, 376, 56/DIG. 9, 24, 25.4, 10, 20, 119, 2, 13.5–14.6, 14.9–16.3

[56] References Cited

UNITED STATES PATENTS

| | | | |
|---|---|---|---|
| 1,815,274 | 7/1931 | Ronning et al.............................56/15 |
| 2,442,520 | 6/1948 | Van Skkle...........................56/119 X |
| 2,595,336 | 5/1952 | Corsentino...............................56/15 |
| 3,095,045 | 6/1963 | Ennis et al.........................56/25.4 UX |
| 3,229,451 | 1/1966 | Wenzel et al. .............................56/10 |
| 3,304,698 | 2/1967 | Herbsthofer...............................56/20 |

FOREIGN PATENTS OR APPLICATIONS

| 330,726 | 8/1958 | Switzerland ..............................56/24 |
|---|---|---|
| 609,620 | 9/1956 | Germany..................................56/24 |

*Primary Examiner*—Robert Peshock
*Assistant Examiner*—J. A. Oliff
*Attorney*—Silverman & Cass

[57] ABSTRACT

A field chopping machine including a chaff-cutting device provided with feeding, pressing, cutting implements, and a pickup or receiving apparatus, said device and apparatus being of substantially the same width and attached to a tractor, oriented in the longitudinal axis thereof and disposed laterally adjacent the rear wheel of the tractor; the pickup apparatus comprises a tandem cutting assembly which is separable, horizontally arranged in operating position and upwardly pivotable to a travel position; the tractor drive means is coupled to the field chopper such as to enable attaching a wagon thereto and to operate the field chopper off the tractor drive, the total width of tractor and field chopper during travel being no more than 2.73 yards, thereby meeting public road traffic regulations for vehicles with hitched-on equipment.

14 Claims, 54 Drawing Figures

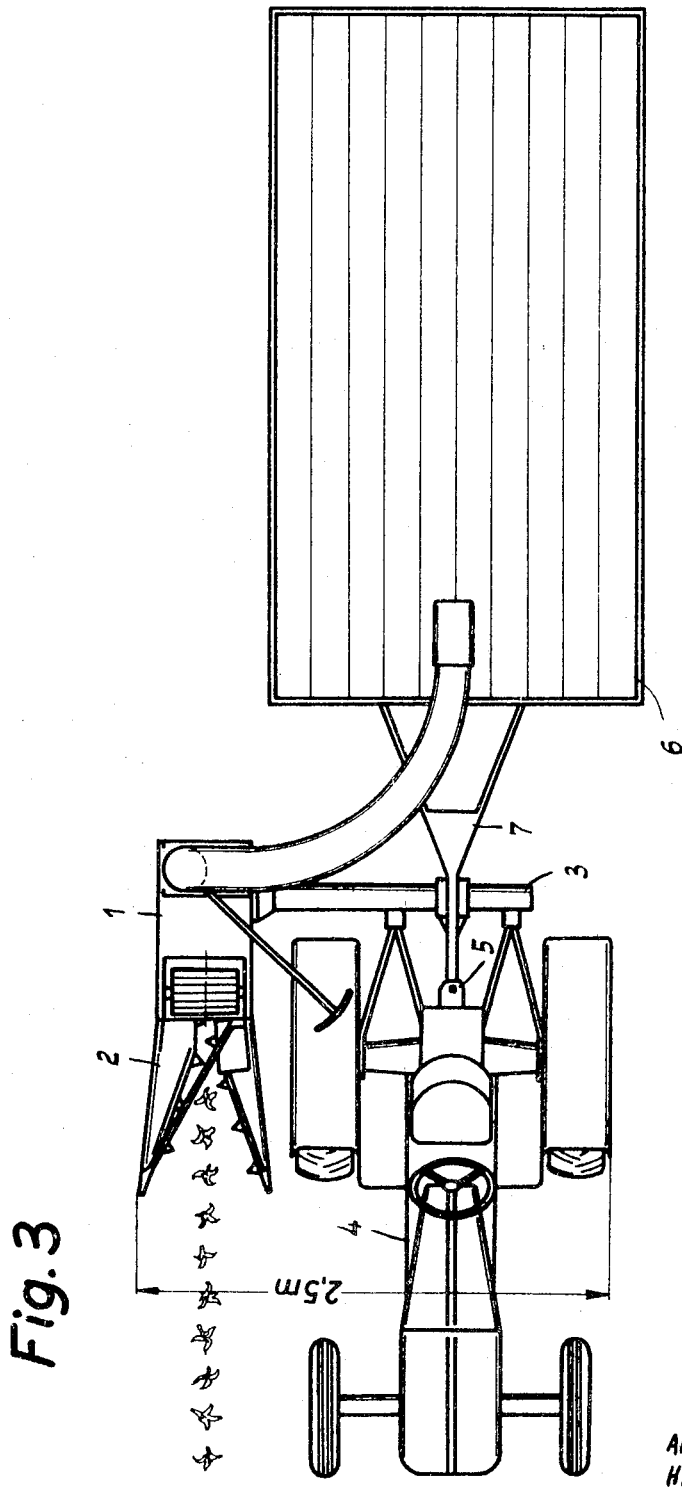

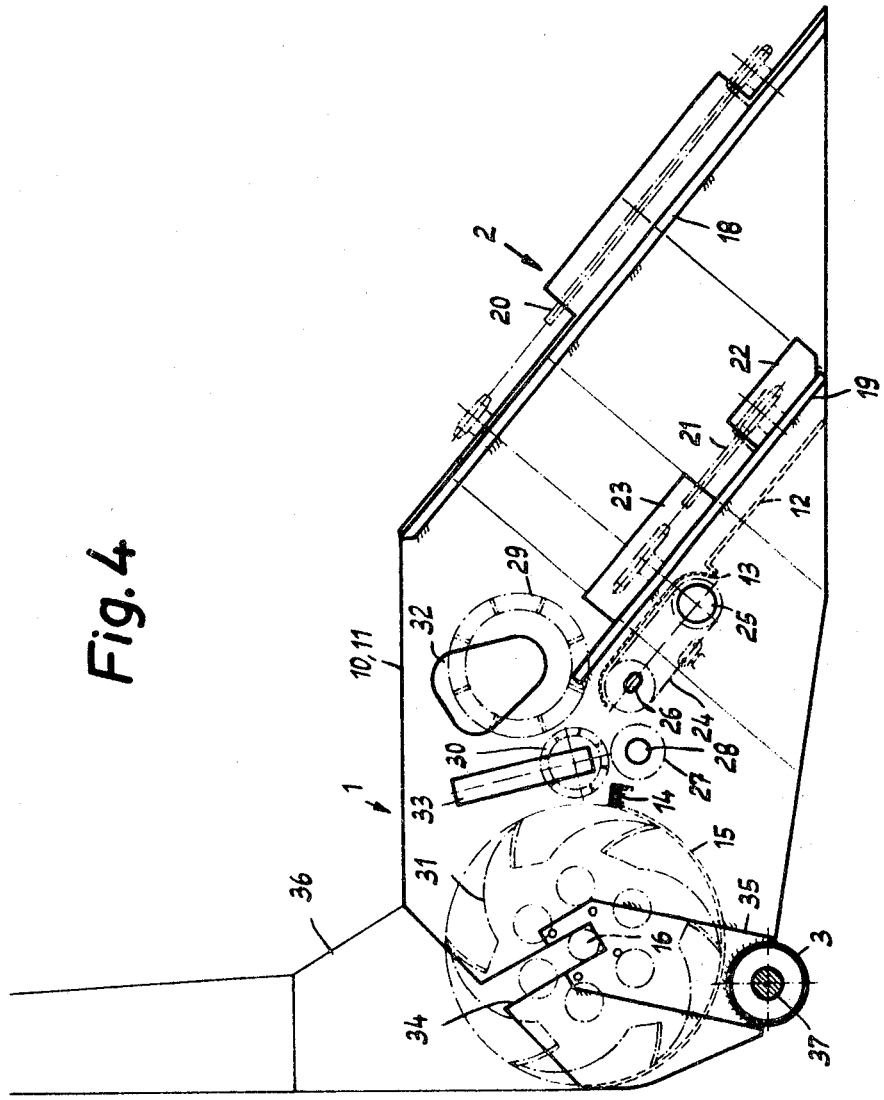

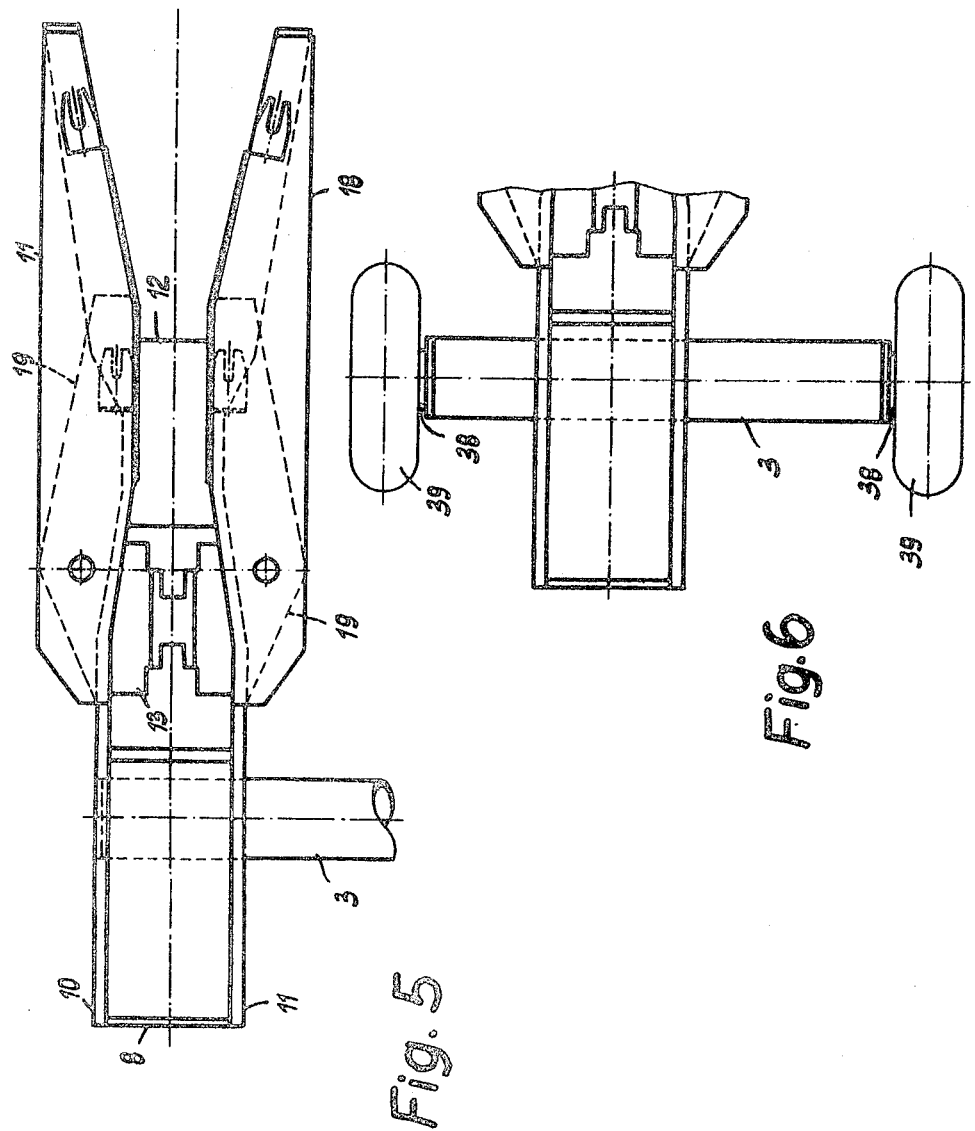

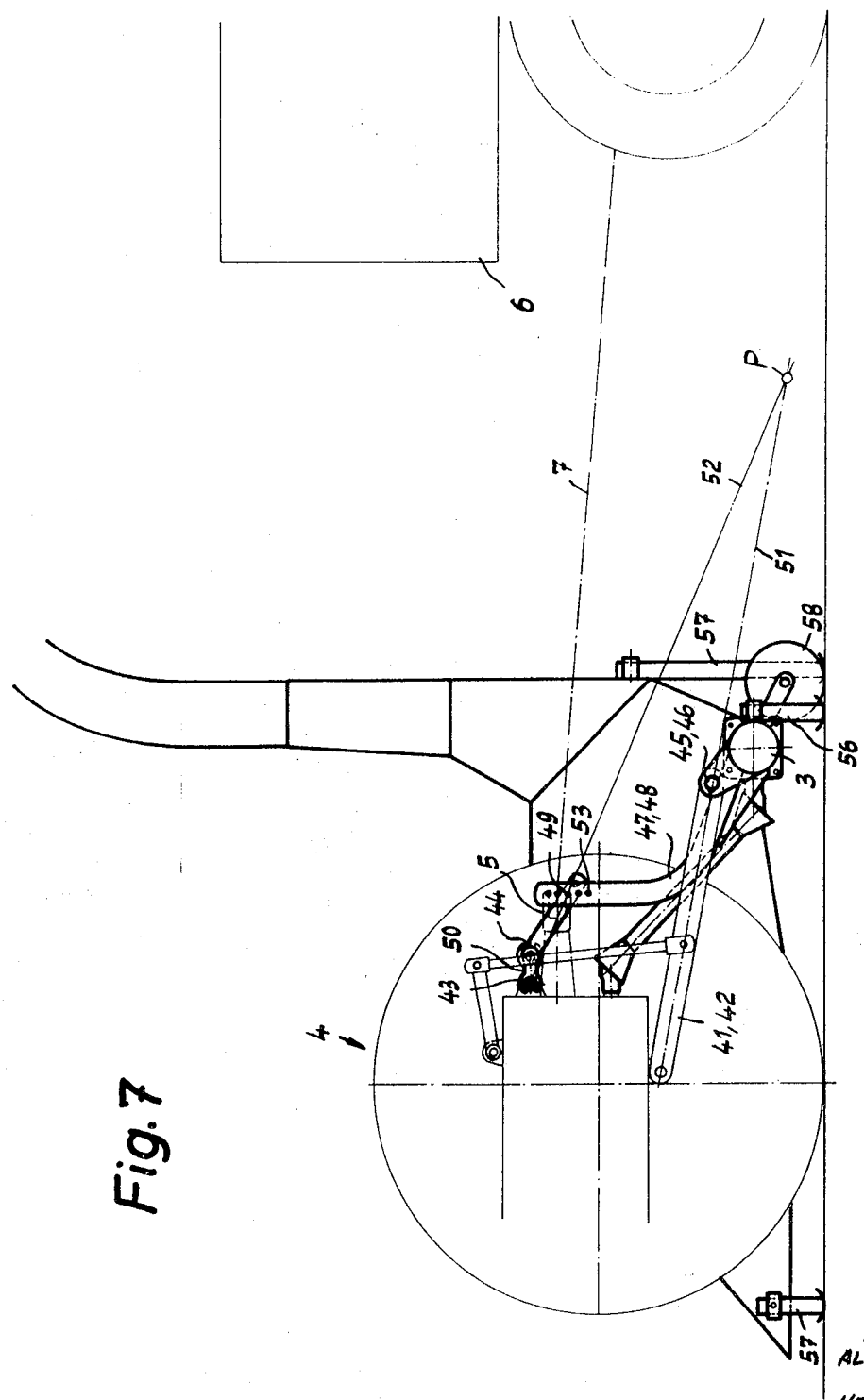

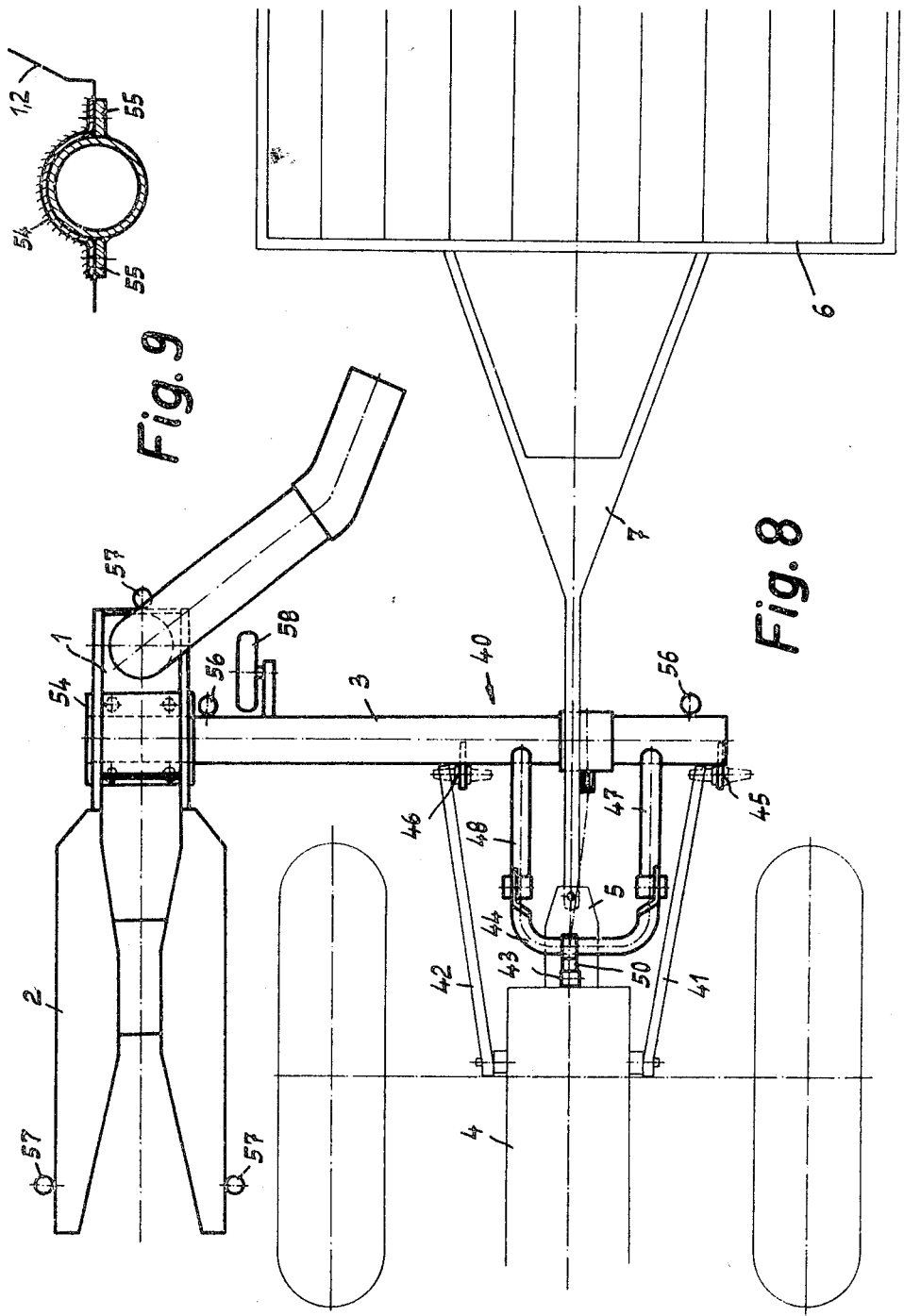

INVENTORS:
ALFRED EGGENMULLER
HEINRICH BELLAN
RUDOLF WOHRLE
LORENZ SCHERER

BY
Silverman & Cass
ATTORNEYS

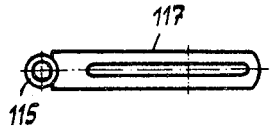
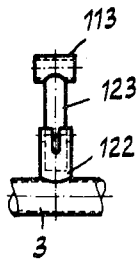
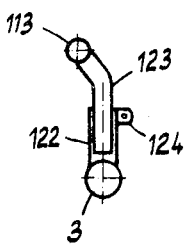
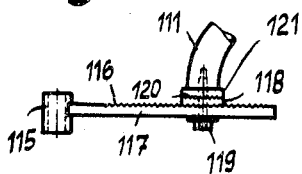
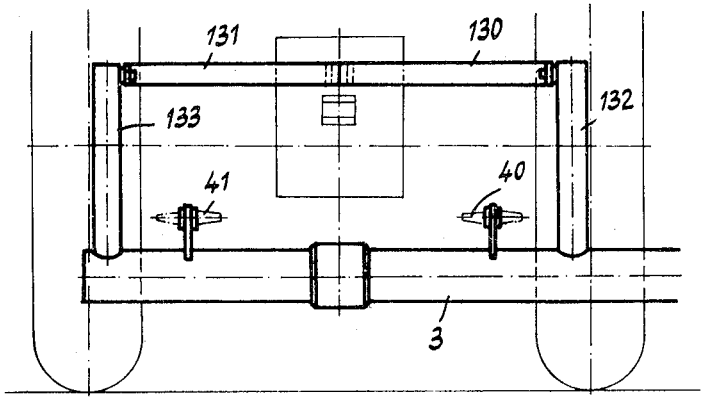
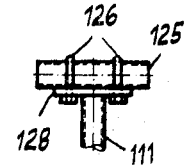
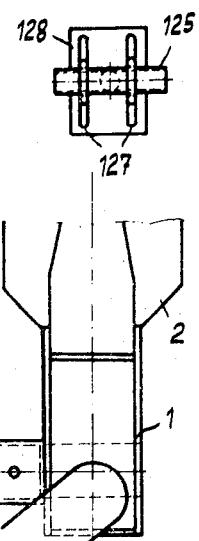
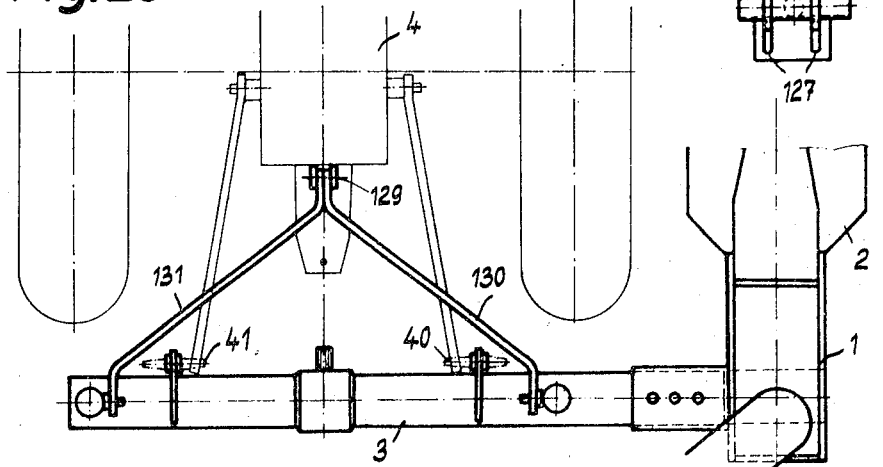

INVENTORS:
ALFRED EGGENMULLER
HEINRICH BELLAN
RUDOLF WOHRLE
LORENZ SCHERER

BY
Silverman & Cass
ATTORNEYS

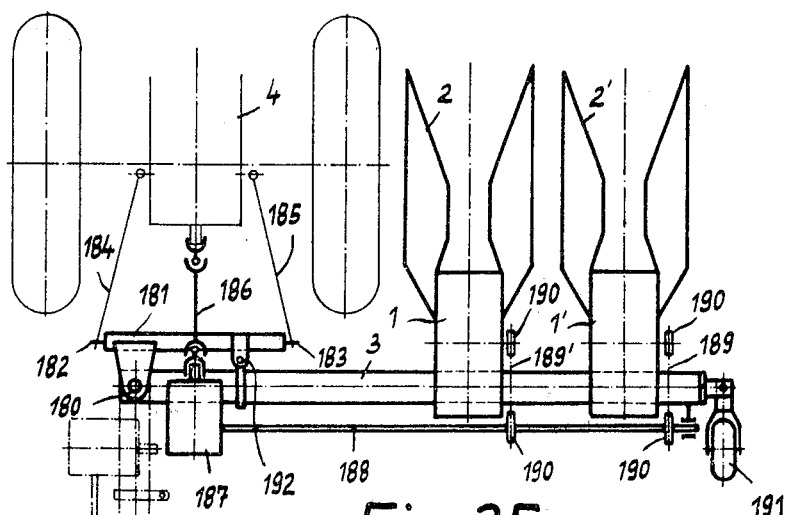
Fig. 35
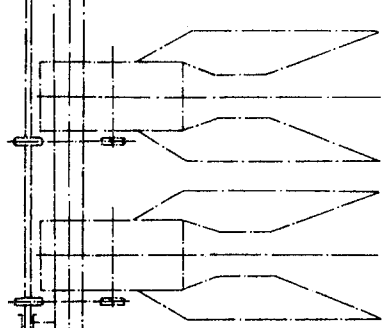
Fig. 36
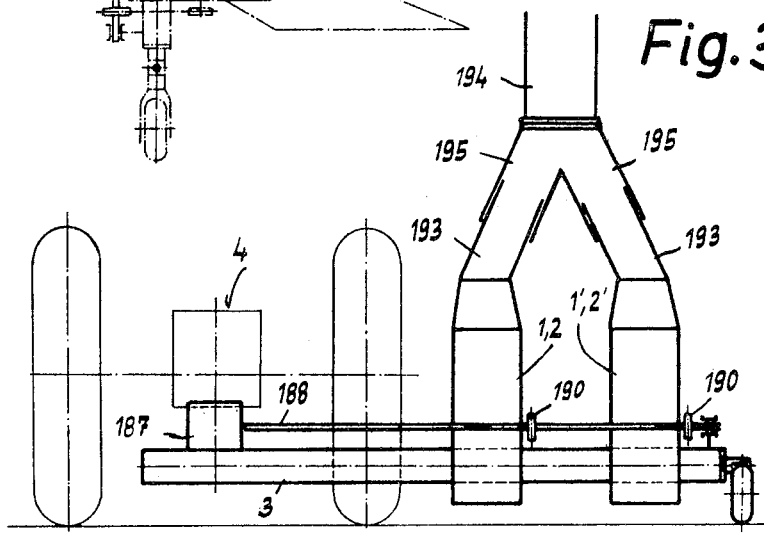

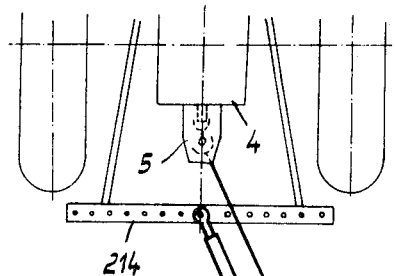
Fig. 42
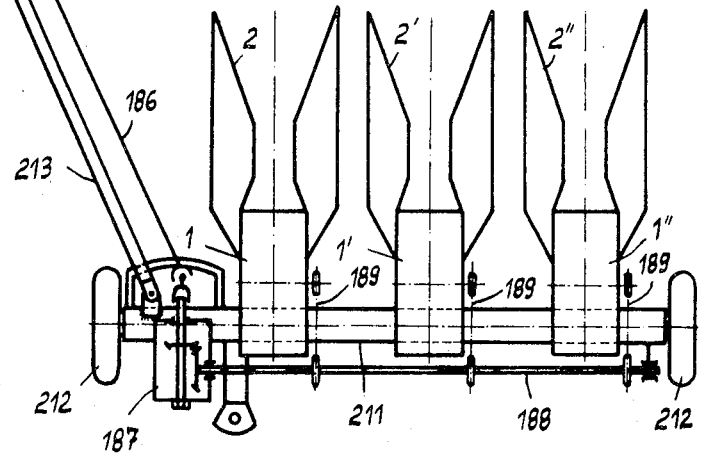
Fig. 43
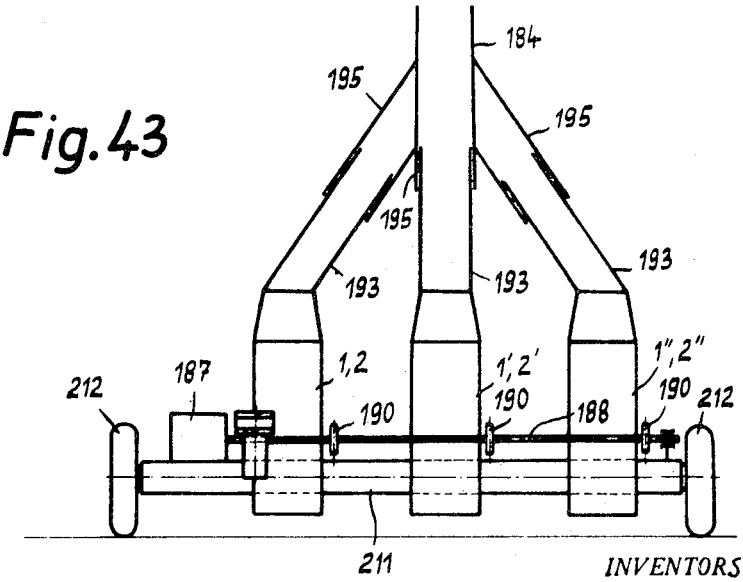

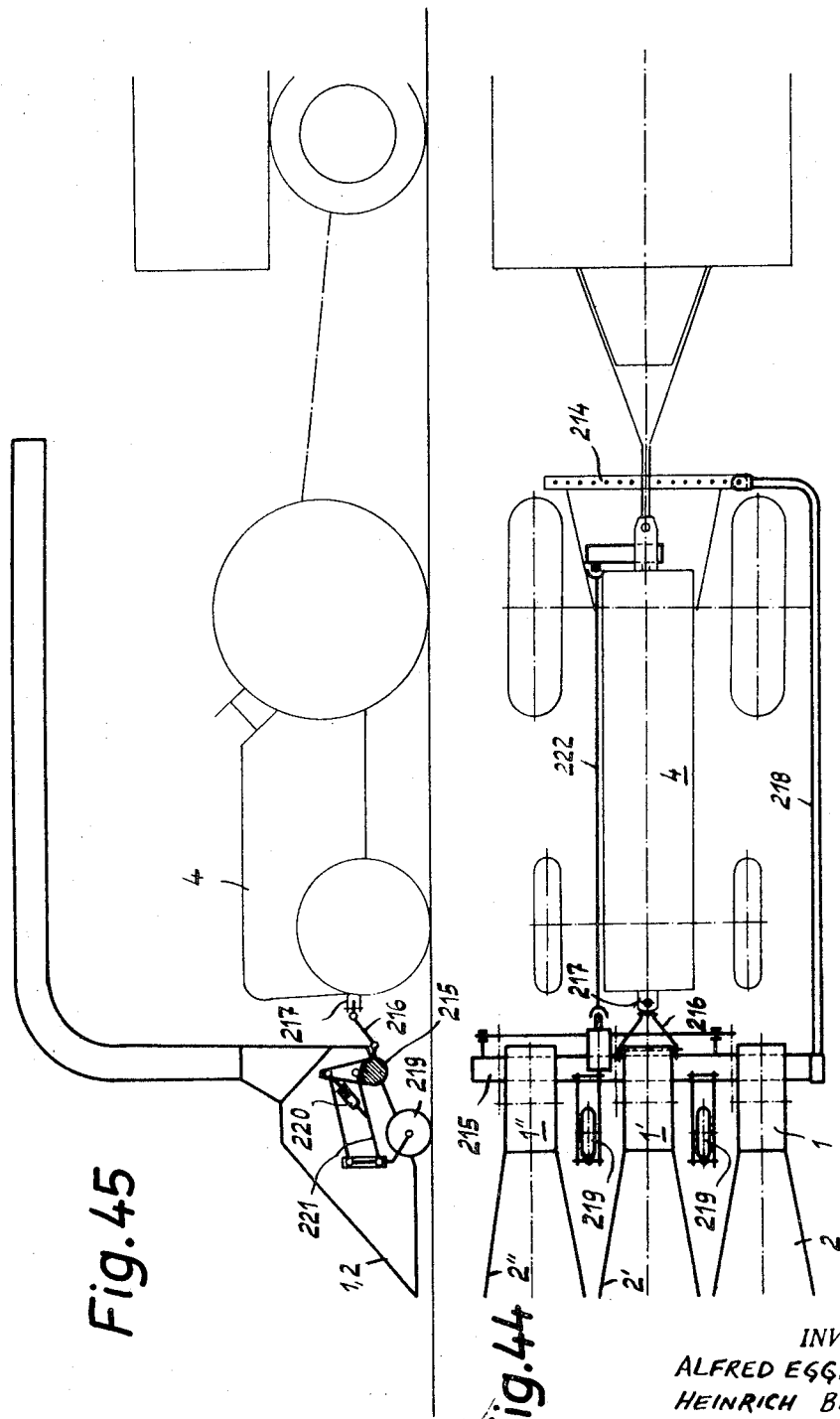

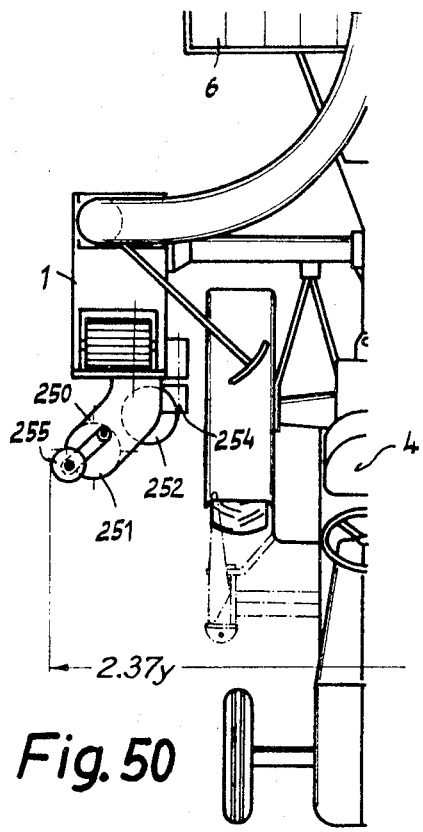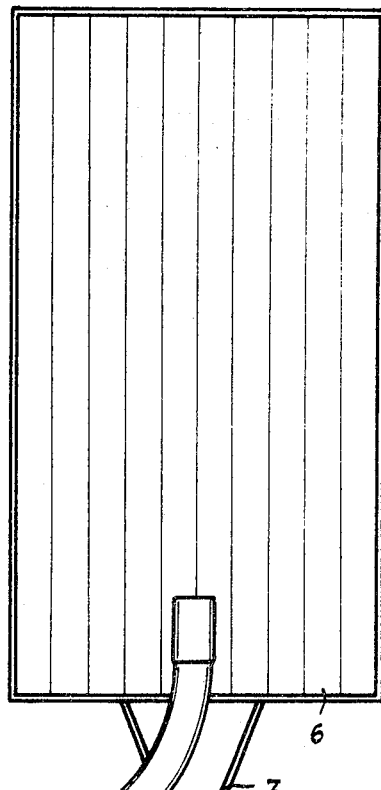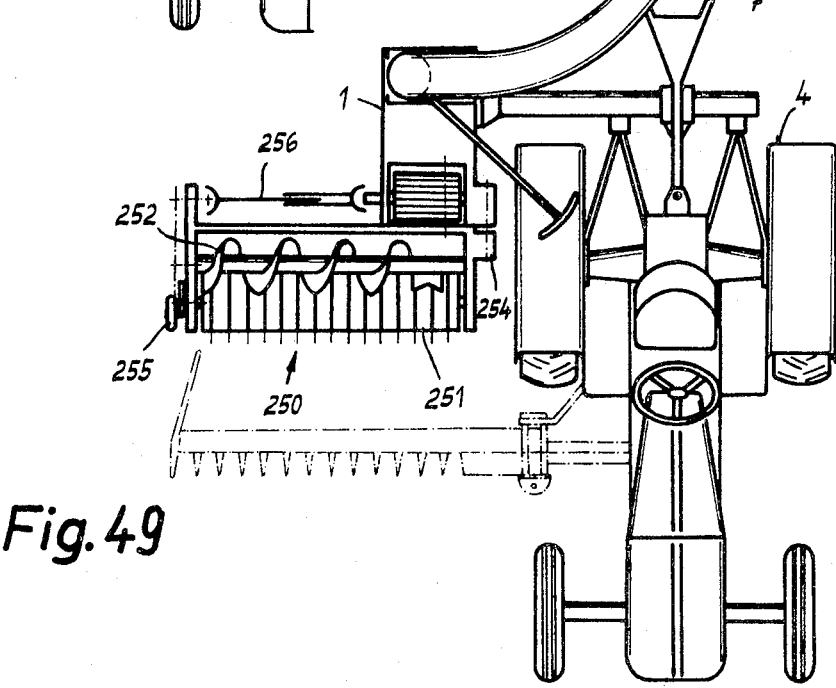
Fig. 50
Fig. 49
INVENTORS:
ALFRED EGGENMULLER
HEINRICH BELLAN
RUDOLF WOHRLE
LORENZ SCHERER
BY
Silverman & Cass
ATTORNEYS

INVENTORS:
ALFRED EGGENMULLER
HEINRICH BELLAN
RUDOLF WOHRLE
LORENZ SCHERER

BY Silverman & Cass

ATTORNEYS

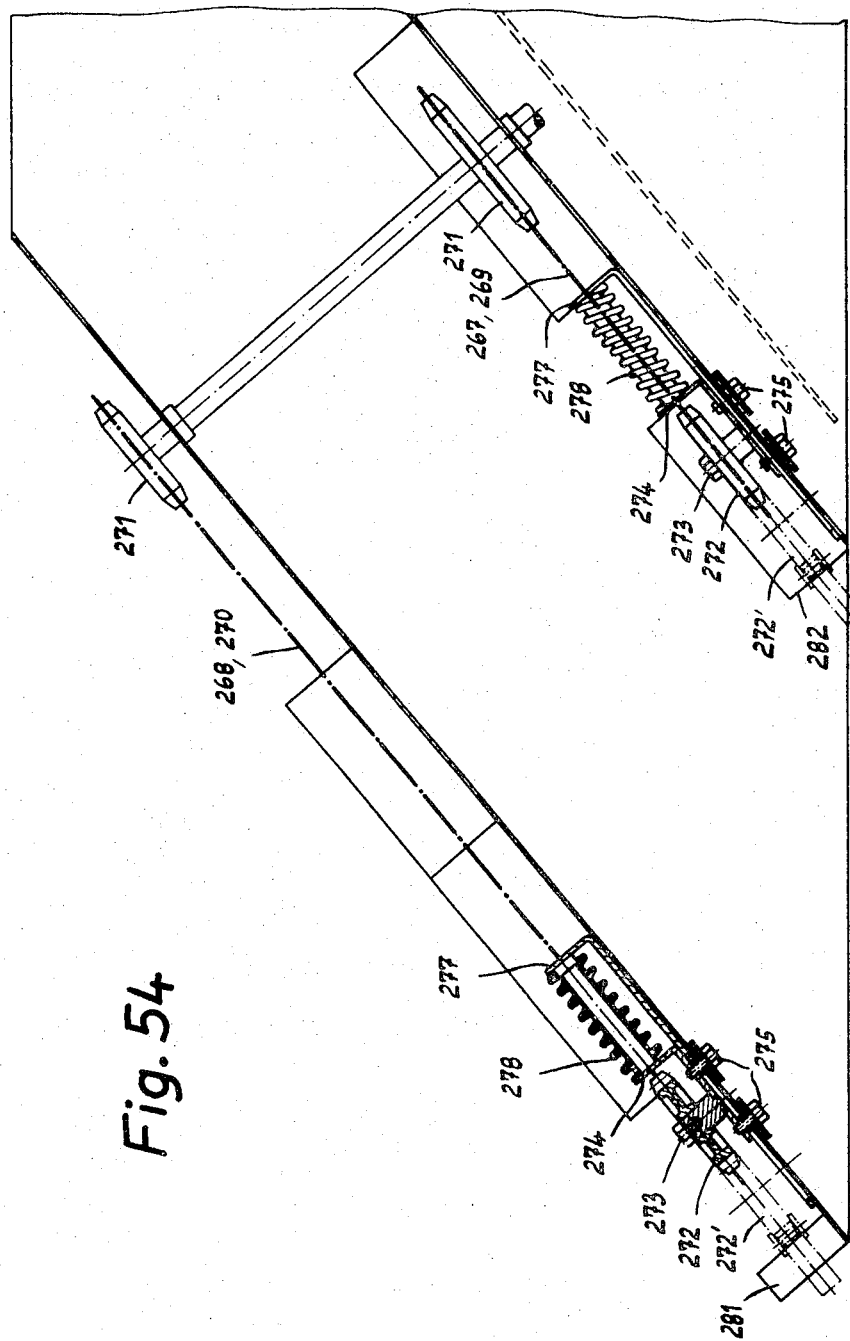

FIELD CHOPPING MACHINE ATTACHABLE TO A TRACTOR

The invention relates to a field chopper with a hitching frame hitchable to a tractor, said chopper carrying laterally and protruding beyond the tractor a chopping apparatus with receiving means.

According to prior art a field chopper with laterally arranged feeding and discharge assembly connectable to the three-point suspension of the tractor is known already, where the material to be chopped is fed in longitudinal and transverse flux to the cutting apparatus. This field chopper according prior art comprises substantially a chopper part located in the tracks of the tractor, the cutting drum, the counter blade, the discharge and the prepressing installation, and a jib part laterally protruding, containing a receiving device and a cross feeder, which jig part is mounted on the chopper in a manner where it can be lifted up.

In such a design a balanced construction, uniform loading of the rear wheels of the tractor and easy convertibility from operating to transportation position is achieved, but this design is afflicted with the disadvantage that by arranging the chopper within the moving track of the tractor its clutch jaw or hitch for hitching a vehicle is no longer accessible. Consequently, means must be provided at the chopper making it possible to hitch a vehicle behind the field chopper. However, this is possible only for two-axle vehicles, while no one-axle vehicle can be hitched with its traction pole to the hitched-on field chopper.

It also has become known from the prior art to arrange a beater-type field chopper laterally besides the tractor and to connect it in the hitching method by means of a hitching frame with the lower steering means of the three-point lever system. The third connection is established by a strut between the hitching frame and the differential housing of the tractor. Although in this design the clutch jaw or hitch for hitching the vehicle on is accessible, the machine designed as beater-field chopper, due to the principle and arrangement of the receiving means is so large in its design, that the total vehicle width of tractor and beater-field chopper comes to 3.28 yards. This has the very serious disadvantage that such equipment cannot travel on public roads because according to the ordinance for admission of vehicles for road traffic, only a total width of vehicles with hitched-on equipment of 2.73 yards is admitted. In addition, due to the wide lateral protrusion of this chopper a supporting and scanning wheel located on the outside at the chopper is needed for certain operations with this chopper.

The problem to be solved by the invention consists in creating a hitched-on field chopper which is arranged laterally besides the chopper, so that the clutch jaw or hitch of the tractor remains accessible for hitching on a vehicle, and so that with the device built-on the total width of tractor and field chopper of 2.73 yards will nevertheless not be exceeded.

According to the invention this problem is solved by the fact that the feeding means and the chopper means with feeder, pressing and cutting means form a narrow oblong construction unit oriented in the longitudinal axis of the tractor, that the receiving means and the chopping means have approximately the same width and are arranged laterally besides the rear tractor wheel.

According to a further design of the invention the receiving means is a cutting mechanism with cutters in series. Such a field chopper is particularly appropriate for chopping corn and since the cutting mechanism with cutters in series preceding the chopping apparatus does not exceed the admissible vehicle width, operation on public roads is possible without any modification in the design.

According to a preferable embodiment of the invention the cutting mechanism in series is removable. Thus the cutting mechanism in series may be replaced with a receiving means of another design for different field operations.

In order to be able to provide the field chopper according to the invention also with a receiving means preceding the chopping apparatus and protruding over the latter, for certain operations in the field, the receiving means arranged vertically in operating position is pivotable vertically around an axis located in driving direction and lockable.

When operating on public roads such a discharge means is pivoted upwardly and then tractor and field chopper only occupy the admissible total width.

According to a further embodiment of the invention the axis or shaft is located at the side of the chopping means facing the tractor.

Preferably the receiving apparatus comprises a receiving drum and a transverse conveyor worm gear which is driven by an articulated shaft form a shaft of the chopping apparatus.

In order to prevent damage or deformation of the receiving apparatus in the upwardly pivoted position, according to a further improvement of the invention the drive of the receiving drum and of the transversal conveyor worm gear is automatically disconnectable by a clutch when it is pivoted up into the position for transportation.

In order to produce a simple, but nevertheless stable design for the chopping apparatus with cutting mechanism in series, according to a further improvement of the invention all components of the cutting mechanism in series and of the chopper part are arranged between two lateral walls, which each consist of one unit, said walls being interconnected at a distance corresponding approximately to the width of the drum and the remaining components and which jointly form a self-supporting frame and/or housing of the field chopper. The result being that no special frame as carrier for the individual components of the field chopper is required. Merely two correspondingly shaped sidewalls are needed which according to a preferred characteristic of the invention are interconnected via bottom panels located in the area of the cutting mechanism in series and via a partial section connected with the cutting iron around the drum shaft and a crossbeam.

According to an additional characteristic of the invention recesses are provided in the lateral walls for the positioning and/or guidance of the individual components of the field chopper. This renders superfluous special bearing jacks, fastening panels etc., as required in the field choppers with special carrier frames as known from prior art, and this contributes toward further reduction in weight and toward cost reduction of the machine. If the machine is to be designed as field chopper attachment, the crossbeam connecting both sidewalls can simply be extended into a jig or an extension jack for the lateral attachment of the field chopper to a tractor or car. Of course, it also is possible to design the field chopper in the construction as per the invention as a trailing machine, if the crossbeam is designed as an axle and wheels are mounted thereon.

In order to create a simple attachment for lateral connection of the harvesting means at the tractor, where the hitch of the tractor remains accessible for hitching a vehicle, but which thanks to its simple design and equally favorable conditions of power is much lighter in its weight, according to a further improvement of the invention, two vertically oriented struts extending almost to the clutch jaw of the crossbeam are arranged at a crossbeam extending beyond the center of the tractor, carrying the clutch bolts for the bottom steering means, a bow being positioned freely pivotably at said crossbeam and having a bearing eye connectable to the point of connection for the top steering means at the tractor.

According to an additional characteristic of the invention the struts located at the crossbeam have the shape of a bow or angle, whose leg oriented toward the crossbeam extends in almost horizontal direction and whose leg extending toward the point of connection at the tractor extends in almost vertical direction.

That way the entire area and/or pivoting area around the traction jaw behind the tractor is completely unobstructed, so that even upon negotiating narrow curves collisions between the drawbar of the vehicle and parts of the harvesting machines are prevented.

In order to be able to use the accessory at different sizes and designs of tractors, several perforations are provided at the angular struts fastened to the crossbeam in the legs directed toward the point of connection of the tractor, and moreover, the shanks or legs of the bow also have several perforations.

That way the connection of the accessory to the point of connection for the top steering means at the tractor can be established simply in case of different sizes and designs or models of tractors.

In order to be able to attach to tractors equipped with a three-point leverage system, a field chopper extending in operating position from the coupling points for the connection of the three steering means in a forward direction, a strut representing the third connection between the accessory and the tractor is so arranged according to a further improvement of the invention when using the standard bottom steering means and the standardized point of the connection for the upper steering means that the centerline of bottom steering means and the strut bisect and/or intersect in lowered position at a point located behind the steering points for the bottom steering means. The intersecting point of the strut, which in this case replaces the upper steering means, with the bottom steering means, represents the ideal point of guidance around which the unit pivots during the lifting motion. Because this point is located behind the lower points of articulation at the equipment or accessory side and can be adjusted according to an additional feature of the invention at a distance from the points of articulation, it is possible to lift the accessory almost parallel, or if necessary with the tip pointed more away from the bottom.

In an expedient additional improvement of the invention, the accessory can be so designed that the field chopper is removably connected to the frame for the accessory, with the advantage that different harvesting devices requiring such attachment can be attached to the same attachment means. Thus, for example, a mowing mechanism or the like may replace the chopper.

In order to facilitate the hitching of the harvesting means to the tractor, retractable supports are provided at the hitching frame, on which the apparatus can be deposited in a height and level favorable for the attachment. Supports also are provided on the harvesting apparatus in order to make it possible to attach, withdraw or mount the machine in relation to the attachment means.

Another characteristic of the invention consists in that a supporting wheel is provided at the attachment frame making possible an adjustment of the machine in its cutting height from the ground. The supporting wheel offers the advantage for an accessory that the lower steering means of the three-point lever system need not be maintained and/or adjusted at a certain distance above the ground by the tractor power lift. The supporting wheel may of course be fastened just as well to the harvesting machine itself.

In order to design the attachment means and the drive for a field chopper operating laterally besides the tractor, so that the field chopper comes outside the pivoting range of the harvest vehicle hitched to the tractor, without the articulated shaft leading from the power takeoff shaft of the tractor to the angle gear at the attachment frame assuming an unfavorable and/or inadmissible angle, a further improvement of the invention is characterized by arranging the drive shaft of the harvesting means ahead of the clutch or coupling bolts and of the connecting pin of the articulated shaft at the angular or miter gear behind the clutch bolts for the bottom steering means of the three-point lever system.

The idea on which the invention is based, namely to place the harvesting apparatus with its drive shaft further in front in order to utilize the pivoting range required for the hitched-on wagon with the crop, and to place the connecting pin for the power takeoff shaft further back at the miter gear, to avoid any inadmissible angling of the articulated shaft, may be solved in various ways. According to one characteristic of invention, it is possible to design the transmission shaft leading from an angular or miter gear of the harvesting machine in two parts by arranging the driven shaft approximately parallel and staggered from the miter gear to the drive shaft at the harvesting machine. It is possible to establish the connection between the two staggered shafts via an articulated or universal joint shaft or via a pair of spur wheels or via a chain drive, for example, Recessing the part, located within the tractor wheels, of the attachment frame also offers the advantage to place the coupling or clutch bolts for the bottom steering means sufficiently ahead of the attachment frame, so that attachment to a rapid clutch also is possible, which is impossible in the attachment frames according to prior art where the coupling bolts are placed closely at or above the crossbeam.

However, when dispensing with the possibility of an attachment to a rapid clutch, the coupling or clutch bolts for the bottom steering means may be placed behind the center of the crossbeam for the attachment frame, so that the crossbeam with the harvester machine comes to be placed further in front. To avoid that in this case the angling of the universal joint shaft becomes too steep a spur wheel gear or a chain drive is placed as reduction gear at the miter gear according to another feature of the invention. This way the connecting pin for the universal joint shaft is further recessed at the miter gear, so that the universal joint shaft comes to rest in its admissible angle range. Although this attachment means cannot be connected to a rapid clutch, it offers the advantage that the crossbeam may be designed as a straight component in which the transmission shaft leading from the miter gear to the harvesting machine is located.

For harvest wagons without automatic loading means, for example, chopped straw wagons, whose body structure is placed substantially above the traction pole, the crossbeam of the attachment means protruding laterally beyond the tractor width actually does no harm, only the wagon structure may harm such as by striking against the housing of the harvesting machine when following curves in the road—. In this case the crossbeam can easily be designed as a straight part. All that is necessary is to place the harvesting machine located substantially above the crossbeam further in front. According to a feature of the invention the housing and/or the frame of the harvesting machine is connected via beams extending substantially rearward with the crossbeam of the attachment means.

In order to offer the possibility of propelling the harvest wagon independently of the harvesting means, for example for unloading the harvest wagon, a shifting clutch known as such from prior art is provided according to a further improvement of the invention on one of the shafts transmitting the propulsion from the universal joint shaft to the harvesting apparatus.

Another advantageous feature for the design of the drive means is characterized by the fact that a spur wheel pair or a chain drive is arranged as reduction gear at the miter gear and that the shift clutch is provided on the shaft connecting the reduction gear with the miter gear. The shift clutch according to the invention can be arranged particularly favorably on a miter gear equipped with a reduction gear. The shift clutch may thereby be designed as a jaw clutch and be operated by means of a shift lever accessible from the driver's seat on the tractor.

According to another feature of the invention it is advantageous to design the spur gear wheels of the reduction gear as change gears. That way a variable gear with different r.p.m. can be obtained easily. With such a gear it is possible to universally use the attachment and drive mans universally for different harvesting machines which must be operated at different r.p.m. The same effect can of course be achieved with a changeover gear transmitting several revolutions.

For connecting harvesting machines of varying design and size to the same attachment and drive means it may be advantageous to design the crossbeam of the attachment frame carrying the harvesting apparatus longitudinally adjustably in a telescopelike manner. The result being that the harvesting machine in question can be attached in any case laterally at an optimal distance from the rear wheel of the tractor. A particularly close placement of the harvesting means against the rear wheel of the tractor is advantageous in the case of lightweight tractors due to the one-sided rear wheel load and in case of heavy tractors with greater track width to avoid exceeding the admissible vehicle width of the tractor and the attached harvesting apparatus, which according to the road traffic regulations is 2.73 yards.

In the design of the attachment frame with a longitudinally adjustable crossbeam the drive means can be executed most expediently in such a manner that the drive shaft leading from the miter gear to the harvesting means consists of two parts, whereby one shaft end is designed as a multiple edge profile and the end of the other shaft part is designed as a bushing, so that the profile and the bushing form one telescopic part with each other, permitting longitudinal displacements of the shaft and thus the connection of the harvesting means at differential distances from the central axis of the tractor.

In order to create an attachment means making it possible even for tractors with a deep-seated traction jaw with draw pole for deep seating to attach to the standardized three-point lever system operating outside the tractor track and to lift it to an adequate height for transporting, the attachment jack connectable with the three steering means of the three-point lever system is arranged above the traction pole of the harvest wagon, according to another improvement of the invention.

A preferred embodiment of the invention consists in the fact that at one of the crossbeams containing the connections for the three-point lever system and accommodating a miter gear and a drive transmission shaft, an arm preferably oriented obliquely downwardly is located outside the rear wheel of the tractor, drive transmission elements and connecting means for the harvesting apparatus being provided at said arm.

The result of this measure accomplishes that the part, located behind the tractor in the area of the traction pole of the harvest wagon, and pertaining to the attachment jack is located above the traction pole and thus is not impeded by it during its release movement, whereas the part of the attachment jack used to establish connection with the harvesting apparatus is located in proximity of the ground, so that the usual and known harvesting means can be attached thereto without substantial modifications.

According to another feature of the invention it also is possible to design the crossbeam of the attachment jack so that it extends rectilinearly beyond the width of the tractor to the harvesting means and by providing connection means for the harvesting apparatus at that end.

According to another characteristic of the invention it is possible to so provide the clutch or coupling points for the arrangement of the attachment jack that the attachment jack may be connected optionally at differential distances from the ground with the three-point leverage system of the tractor.

Such a design makes possible the use of both types of harvest wagons and tractors, that is both the standard harvest wagons with straight traction pole at the upper traction jaw and harvesting wagons with deep-seated suspension can be hitched to the lower traction jaw and/or the traction pendulum of the tractor.

Because in different tractors the power takeoff shaft of the tractor is at different relations to the traction jaw, and due to the attachment of the attachment jack at the three-point lever system at various levels from the ground resulting in different positions in relation to the power takeoff shaft, different angles result for the cardan joint shaft leading from the power takeoff shaft to the miter gear. To prevent a possibly too-great angling of the Cardan joint shaft, according to another feature of the invention a reduction gear comprising a spur wheel pair is assigned to the miter gear connected to the crossbeam which reduction gear may so be connected optionally to the miter gear that the connecting pin for the Cardan joint shaft is located either below or above the crossbeam.

If the same harvesting means is to be used for loading or filling both types of harvesting wagons, that is those with high suspension and with low suspension, two superposed fastening means may be used thereon for connection to the attachment jack, making possible the connection of the attachment jack to the harvesting apparatus in a higher or lower position.

In order to create an attachment means for the three-point lever system at the tractor, leaving the traction jaw of the tractor free, whereby the pivoting range for the pole of a wagon is increased substantially, the coupling for the connection of the upper steering means is placed according to a further improvement of the invention eccentrically, preferably outside the coupling points for the lower steering means, at the crossbeam of the attachment frame.

As a result of the far eccentric position of the coupling the area required for hitching a wagon around the traction jaw is completely exposed even with the accessory attached in lateral direction, so that the maneuverability with the tractor and wagon is in no way impeded even in case of U-turns and of negotiating narrow curves.

According to a preferred embodiment of the invention the upper steering means has means for longitudinal modification at its end on the tractor side, in order to make possible the adjustment of the accessory to the position required for the different operations and the adaption to different tractors. For different tractors the articulation parts for the upper steering means and the traction jaw are very close together on the tractor side, so that in these cases it is advantageous to design the bearing eye of the top steering means pivotably and lockably which bearing eye is used to establish the connection with the tractor.

In the standardized three-point lever system both bottom steering means and the top steering means are so arranged in relation to each other that their centerlines intersect at one point ahead of the rear axle of the tractor. Because the top steering means is shorter than the two bottom steering means and the three steering means form, viewed from the side a trapezoidal four-bar articulation with each other, the attached harvesting device is lifted when being raised into transportable position, higher in the rear than in the front. This is both unobjectionable and desirable for accessories which substantially extend rearward beyond the coupling points for connection to the three steering means. However, difficulties when accessories are to be attached which substantially extend ahead of the three points of coupling, as is the case for example with a cultivation field chopper with cutting mechanism in series operating laterally besides the tractor. Such an apparatus has, in relation to its transverse extension, due to the cutting mechanism in series preceding the chopper part, a considerable construction length extending besides the rear wheel of the tractor forward as viewed from the coupling points of the three-point lever system. If such an apparatus were attached to the standard three-point lever system, it would, since the accessory is placed during the lifting obliquely rearwardly, impact with its front end, because it pivots downward, against the ground and depending on the degree of pivoting it would be damaged or destroyed completely. Moreover, lifting of the apparatus to the required transportation height would be impossible.

In order to make the attachment means usable also for the aforedescribed accessories, according to another feature of the invention the coupling is of longitudinally displaceable design. Due to the longitudinal displaceability of the coupling the angle of the top steering means can be so adjusted that the centerlines of the bottom steering means and of the top steering means bisect or intersect in lowered position at a point located behind the articulation points for the bottom steering means. The bisecting point of the top steering means with the bottom steering means represents thereby the ideal guiding point around which the accessory pivots during the lifting movement. Because this point is located behind the lower articulation points on the accessory side, it is possible to lift the apparatus almost parallel or if necessary more with the tip from the ground.

In an expedient further improvement of the invention the pivoting point on the accessory side for the upper steering means is designed adjustably in a plane transversely to the driving direction and/or in the driving direction. This results in an additional possibility of the attachment means making it universal and allowing for the attachment of the most diverse agricultural accessories.

According to a characteristic of the invention the upper steering means may be designed as a U-shaped bow, whose legs are articulated at couplings arranged outside the coupling points at the transverse carrier. The result is a stable design of the upper steering means as required for heavy accessories.

Finally, according to an additional characteristic the crossbeam of the attachment frame may be constructed of two parts which can be telescoped into each other. This makes possible a lateral displacement of the accessory in relation to the tractor. Moreover, the crossbeam may be equipped with a rapid coupling coacting with clutch elements located at the apparatus, which proved highly advantageous when changing different accessories while using the same attachment frame.

In order to support the front end of an attachable field chopper in a simple manner, according to a further improvement of the invention a supporting wheel pivotable by a hydraulic operating cylinder is located at the field chopper ahead of its center of gravity, preferably in the range of the extension of the rear wheel axle of the tractor, the pressure side of the lifting cylinder being connected with the field chopper so that pressure oil whose pressure is produced by the weight of the lifted or released chopper is conveyable at a selectable moment from the lifting cylinder into the operating cylinder at the chopper. The selection of the moment of the conveyance of oil into the operating cylinder may be effected either by the operator of the tractor or be determined by an automatic switch or blocking means.

For the adjustment of the upper and lower pivoting range of the supporting wheel, for example of the lifting height and cutting height of the chopper, the pivoting range of the supporting wheel is limited by stops, whereby at least one stop may be designed adjustably.

According to another characteristic of the invention a simple and advantageous solution for the lifting and/or release of the front end of a harvesting apparatus operating besides the tractor may be achieved by connecting the front end of the apparatus with the release lever system for the tractor mower mechanism or the mower mechanism. According to a preferred embodiment of the invention the connecting means between the release lever system and the apparatus are adjustable in position and length. Thus the apparatus can be connected in a simple manner with the different tractors and different mowing mechanism designs.

In order to make a drum chopper in compact design with cutting mechanism in series also for several rows, according to a further improvement of the invention several drum choppers containing in each case a cutting mechanism in series, the feed, press and cutting means for the chopper part are combined into one unit as a multirow device.

This offers an advantage, because each individual apparatus has its own cutting mechanism for each row, that is a relatively narrow drum, assuring in each case a good chopping quality and the power requirement in relation to the multirow field choppers known from prior art is lower because the material to be chipped is fed in a straight flow as uniformly distributed cutting pad to the cutting drum.

According to a preferred embodiment of the invention two identical drum choppers are mounted to an extension frame connectable to the three-point lever system of the chopper and extending transversely to the driving direction. The drum choppers may be arranged on the extension frame displaceably and lockably. The adjustability offers the advantage that the apparatus can be adjusted to the different row widths as they occur in practice.

The propulsion of the individual drum choppers is accomplished by an angle drive fastened to the extension frame and a drive shaft from which drives lead to the individual drum choppers.

As a two-row apparatus the field chopper may be designed as pure accessory. If the lift capacity of the tractor is insufficient or if for some reasons a supporting of the field chopper against the soil proves expedient, a supporting wheel may be attached to the outer end of the extension frame.

In order to be able to transport the field chopper for the trip to the field and for the trip back home on public roads, according to another feature of the invention the crossbeam of the extension frame is pivotable around a vertical pin and lockable by a pin or the like. Consequently for transporting the field chopper can be pivoted inwardly from the side of the tractor toward the center or behind the tractor, to the vehicle width admissible for operation over public roads.

For that purpose it also is possible to so design the extension frame that the crossbeam of the extension frame consists of a part connectable to the three-point lever system of the tractor and a part carrying the drum choppers, said parts being interconnected pivotably and lockably. This design offers in addition to the pivotability for transporting position the advantage that, because the extension apparatus comprises the extension frame as such and a part carrying the harvesting apparatus removable from the extension frame, the extension apparatus also can be used for other harvesting equipment. In order to connect both crossbeam parts of the extension frame a rapid clutch automatically establishing a rigid connection, as known from prior art, may be used.

According to another characteristic of the invention it is possible to fasten in case of a two-row apparatus a drum chopper to the part of the extension frame subsequent to and connectable to the three-point lever system, and the other drum chopper to the pivotable part of the extension frame. This design offers the advantage of operating the field chopper in one or in two rows.

The extension frame connected to the three-point lever system of the tractor is so designed that the traction claw for hitching the car is completely free even with the machine connected. In order to avoid impeding access to this freed space even with the machine pivoted inwardly for transportation, according to another preferred embodiment of the invention the outer pivotable part of the crossbeam with the drum chopper fastened thereto is pivotable upwardly for transportation— around a shaft placed in driving direction.

It is possible of course, also, to design the field chopper according to the invention also as a trailer device, whereby according to a feature of the invention it is fastened to a crossbeam supported on wheels.

This design will prove particularly expedient if more than two drum choppers are to be arranged side by side, where the lifting capacity of the tractor power lift no longer suffices for the lifting.

Within the scope of this invention it also is possible to fasten several identical drum choppers on a carrier installed at the front loader of the tractor ahead of the tractor.

According to another feature according to the invention for the mounting in front of the tractor several identical choppers are fastened to a carrier articulated at the front traction jaw of the tractor, a stabilization bar leading therefrom to the rear field rail of the tractor.

The mounting of a field chopper ahead of the tractor has the known advantages that the tractor operator can observe the apparatus well during operations and, because it is even in case of several rows within the admissible width of the vehicle, no special methods must be taken for operation over public roads. In an expedient design for the mounting means ahead of the tractor the carrier or beam carrying the field choppers is supported over at least one supporting wheel against the ground and adjustable and liftable by a hydraulic cylinder or the like.

According to one feature of the invention the discharge studs of the individual choppers may be consolidated into a discharge knee so that better flow and/or discharge of the chopped material is assured. In order to avoid impeding adjustment of the individual chopper assemblies to differential row widths, the discharge knee may be arranged on the discharge studs with telescopelike adjustment and lockable, or the discharge knee may be connected via flexible intermittent parts to the individual discharge studs.

In order to increase the operating width of a field chopper mounted laterally adjacent to the tractor, without exceeding the admissible overall width of tractor and field chopper of 2.5 meters during transportation, according to another improvement of the invention the field chopper equipped with a width accommodation apparatus or a double row cutting mechanism or with a circular mowing mechanism is pivotable out of an oblique position oriented away from the tractor forwardly for the operating position, into transporting position by an almost vertical axis toward the tractor, whereby part of the width accommodation apparatus and/or the double row cutting mechanism or the circular mowing mechanism comes to rest between the front wheel of the tractor and the rear wheel of the tractor, and the total width of tractor and telescoped field chopper does not exceed the maximum of 2.5 meters.

Such a field chopper is appropriate particularly for larger establishments where large quantities of harvests are obtained, and because the row cutting mechanism and/or the accommodation apparatus or the circular mowing mechanism must not exceed in transportation position the admissible overall vehicle width either, after a simple pivoting of the field chopper toward the tractor operation on public roads is possible without any remodeling.

According to a preferred embodiment of the invention the chopping apparatus comprises a drum chopper known from prior art of compact design and the wide accommodation apparatus comprises an accommodation drum and two transverse conveyor worms conveying toward the center. According to another feature of the invention the wide accommodation apparatus is arranged under an angle corresponding to the oblique position of the chopping apparatus in relation to the operating direction and eccentrically at the chopping apparatus, whereby the end of the accommodation drum, located on the tractor side, of the wide accommodation apparatus projects further beyond the lateral wall of the chopping apparatus than the opposite end. That way a pivoting of the field chopper to the admissible vehicle width is made possible without any obstruction by the rear tractor wheel. For the use of the field chopper in row cultures, for example sweet corn, cabbage, etc., it is equipped with a particular row cutting mechanism. According to the invention it is characterized by the fact that the double row cutting mechanism is formed in relation to the chopping apparatus from a strongly angled sidewall pointing toward the tractor and a sidewall approximately rectilinear to slightly angled, pointing away from the tractor. Both sidewalls of the double row cutting mechanism are so positioned in relation to each other that their extended median lines intersect in the operating position of the field chopper at a point located about midway between the rows of plants to be cut. This asymmetric design of the double row cutting mechanism is caused by the oblique position of the chopper in relation to which the row cutting mechanism must have a position required in operating position with regard to the driving direction. This design makes possible at the same time a pivoting of the field chopper to the vehicle width admissible for transportation, without being obstructed by the tractor wheels.

In different farm operations the field chopper also is used to chop green fodder, which is chopped immediately after mowing. For that purpose, according to the invention it is possible to mount instead of the wide accommodation apparatus or the double row cutting mechanism a circular mowing mechanism ahead of the chopping apparatus. A circular mowing mechanism has the property of throwing the cut fodder in an oblique angle rearward and up. This fact is utilized hereby by throwing the mowed fodder directly from the circular mowing mechanism into the retraction means of the chopper, so that no special receiving apparatus is needed.

In order to restrict the total width of the vehicle, i.e., tractor and field chopper, to a minimum width and to be able to adjust the field chopper to the different tractor gauges, according to another to another feature of the invention the vertical axis around which the field chopper is pivoted is of a design so that it is adjustable transversely to the driving direction.

In order to prevent in a row cutting mechanism of a field chopper that in case of a breakage of a retraction chain the latter can ingress into the components of the chopper, according to a further improvement of the invention the corresponding reversing wheel at the retraction chains is freely displaceable under the tension of a spring in the chain tensioning direction, and a stop is provided adjacent to the reversing wheel at a distance which is smaller than the circle described by the entrainment tips at the released spring around the centerpoint of the reversing wheel.

As a result of this arrangement the retraction chains are held by a spring at all times at the necessary operating tension. In case a spring should break the spring presses the reversing wheel, which in this case also fulfills the task of a chain-tensioning wheel, toward an opposite stop where the defective chain which still continues to move under its mass inertia, sticks, so that it can never get inside the chopping apparatus.

Below the invention is described in detail by means of embodiments represented in the drawing, in which:

FIG. 3 shows a plan view of a field chopper with row cutting mechanism attached to the tractor.

FIG. 4 shows a lateral view of the chopping apparatus with row cutting mechanism, the most important components being shown by thin dots and dashes.

FIG. 5 shows a plan view of the chopping apparatus and the row cutting mechanism;

FIG. 6 shows part of the chopping apparatus in plan view in an embodiment as trailing apparatus FIG. 7 shows a lateral view of the attachment means for the chopping apparatus with row cutting mechanism FIG. 8 shows a plan view of the attachment means having a straight crossbeam;

FIG. 9 shows the connection between harvesting apparatus and attachment frame;

FIG. 22 shows another embodiment of the top steering means;

FIG. 23 shows a plan view of FIG. 22;

FIG. 24 shows a different embodiment of the coupling;

FIG. 25 shows a lateral view of FIG. 24;

FIG. 26 shows a different embodiment for the connection of the top steering means on the equipment side;

FIG. 27 shows a plan view of FIGS. 26;

FIG. 28 shows a different embodiment of the attachment means;

FIG. 29 shows a plan view of FIG. 28;

FIG. 35 shows a two-row drum field chopper viewed from the top;

FIG. 36 shows the drum chopper according to FIG. 1 viewed from the rear, with a discharge stud combined with the discharge knee;

FIG. 42 shows a three-row drum field chopper viewed from the top;

FIG. 43 shows the drum field chopper according to FIG. 41 viewed from the rear;

FIG. 44 shows an embodiment for attaching a field chopper ahead of the chopper viewed from the top;

FIG. 45 shows the field chopper according to FIG. 44 attached in front of the tractor, viewed from the side;

FIG. 49 shows a field chopper built to the tractor with a receiving apparatus;

FIG. 50 shows the field chopper according to FIG. 49 with upwardly pivoted receiving apparatus.

FIG. 54 shows a row cutting mechanism from the side.

Figure 1:
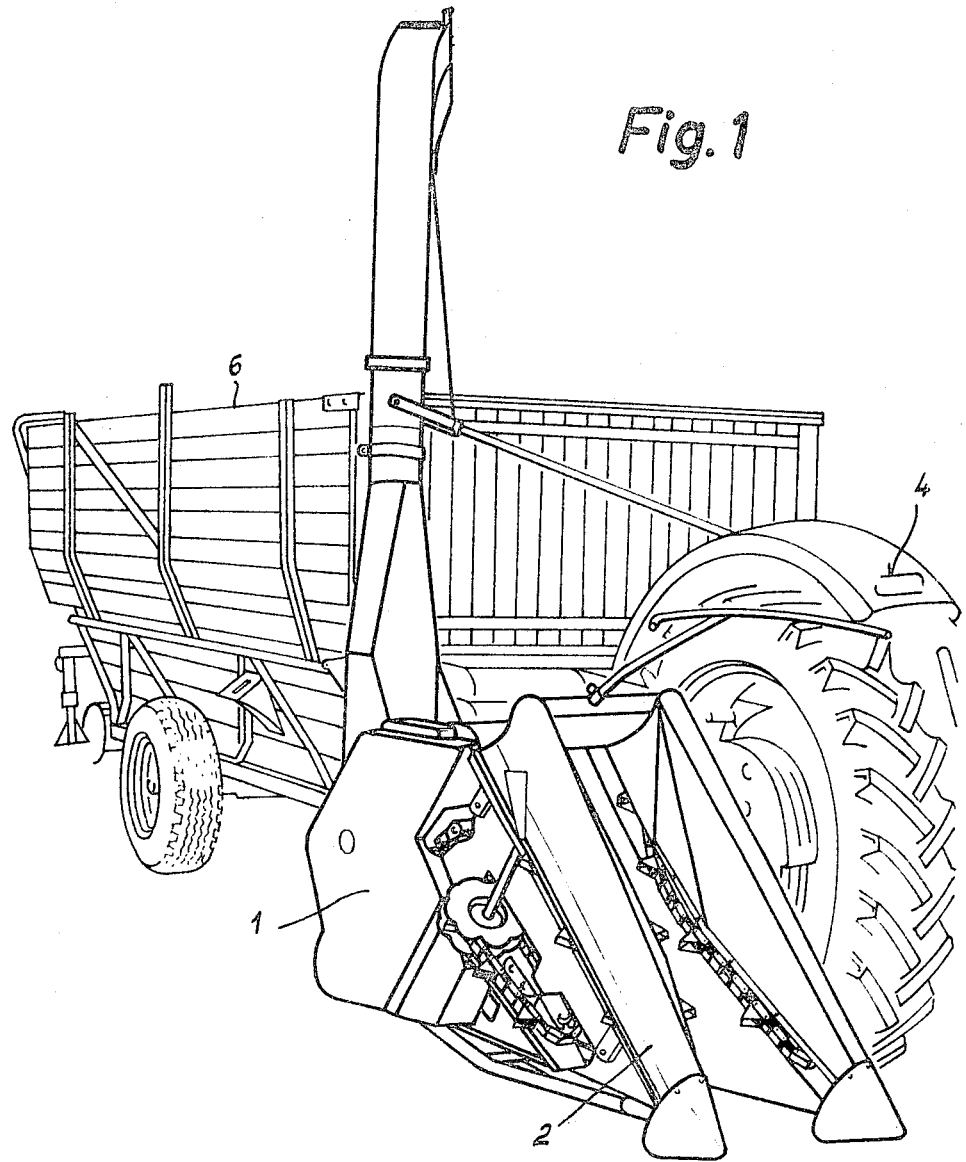
FIG. 1 shows a view in perspective on the rear portion of the tractor with built-on field chopper and a harvest wagon hitched to the tractor.
Figure 2:
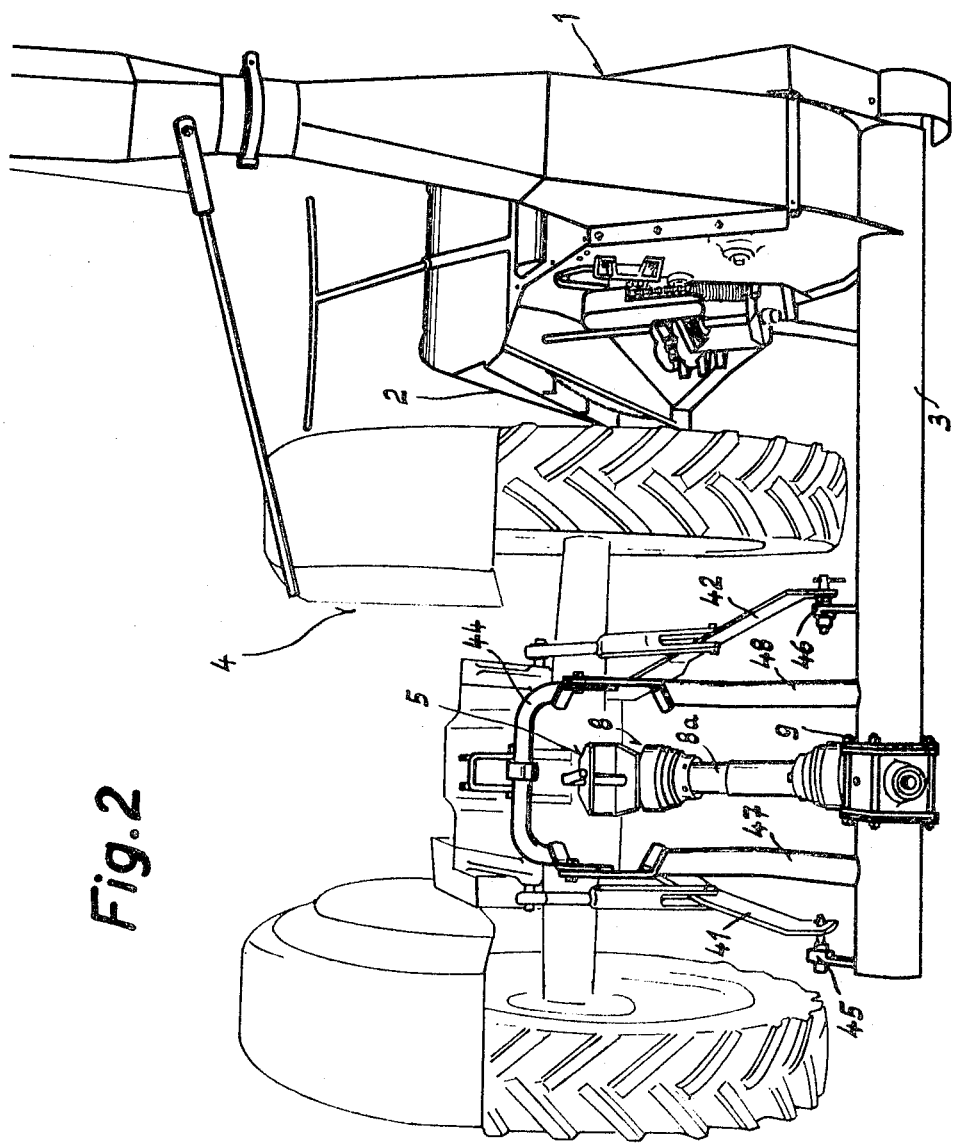
FIG. 2 shows a part rear view of the tractor with built-on field chopper.

A chopping apparatus 1 with a row cutting mechanism 2 installed via a frame 3 to the three-point lever system of the tractor 4 is shown in FIGS. 1 to 3. The attachment frame 3 is here in a plane below the coupling jaw 5, so that a wagon 6 can be hitched behind the tractor 4 directly via its traction pole 7.

The chopping means 1 is designed preferably as drum chopper apparatus in compact design and located with its preceding row cutting mechanism 2 outside the tractor track laterally adjacent to the rear wheel of the tractor. The row cutting mechanism 2 and the feed, pressing and cutting means of the chopper apparatus 1 are so synchronized with reference to each other that they can be consolidated into as small a construction unit as possible so that a total width of the chopping apparatus 1 with the row cutting mechanism 2 and the tractor 4 will not exceed 2.5 meters.

The drive of the chopping apparatus 1 with row cutting mechanism 2 is accomplished from the power takeoff shaft 8 of the tractor via a cardan shaft 8a and an angle drive 9 forming one construction unit with the frame 3.

The housing of the chopping apparatus 1 with the row cutting mechanism 2 is designed as self-supporting frame according to FIG. 4, and comprises in the main two identical sidewalls 10,11, of corresponding mirror-image design, interconnected via bottom panels 12,13 and via a cylindrical partial section 15 forming the cutting housing, with the cutting irons 14, around the drum shaft 16, and with a crossbeam 3. For clarity, the parts pertaining To the housing and/or frame of the chopper apparatus with row cutting mechanism are shown in solid lines, the remaining components are shown in dots and dashes. The connection of the sidewalls 10,11 is expediently established by welding to that parts 10, 11, 12, 13, 15 and 3 jointly form an omnilaterally stable, self-supporting frame for the positioning and fastening of the individual components of the chopper apparatus with row cutting mechanism. In order to increase the stability of this frame in transverse direction two reinforcement ribs are welded bilaterally to the sidewalls 10,11 in each case which are used at the same time to fasten the bearings for the chain wheels of the upper retraction chain 20 and of the lower retraction chain 21 of the row cutting mechanism—. For the passage of the lower retraction chain 21 openings 22,23 are provided in the sidewalls 10,11.

In addition, perforations 28 are provided in the sidewalls 10,11 for positioning the feed chain 24 and for the positioning of the smoothing roll 27. Recesses 32 and/or oblong holes 33 are provided for the retraction roller 29 which is freely movable against spring pressure and for the pressing roller which is guided approximately tangentially to the cutting drum 31 and freely movable in said guide. The cutting drum 31 is inserted from the outside for simple mounting into the slots 34 arranged in the sidewalls 10,11 and fastened to the crossbeam 17 by rigidly connected bridges 35. The discharge channel 36 is arranged behind the cutting drum 31 in the usual manner.

FIG. 5 shows the self-supporting frame of the chopping installation with the row cutting mechanism as welded together from parts 10, 11, 12, 13, 15 and 3 and the reinforcement ribs 18, 19 on both sides into one unit. The components of the chopping apparatus and of the row cutting mechanism are deleted in order to show distinctly the frame according to the invention. The crossbeam 3 which preferably is made from a tube is used at the same time as accommodation and guard for the drive shaft 37 leading to a cone drive not shown which is propelled from the power takeoff shaft of the tractor.

If the chopping apparatus with row cutting mechanism is to be designed as accessory normally operating laterally adjacent to the tractor, the crossbeam 3 must be so long in dimension that connections for the three-point lever system of the tractor 4 can be provided thereon.

If the chopping apparatus with row cutting mechanism is to be designed with he frame according to the invention as trailing apparatus, the crossbeam 3 may be designed in a most simple manner, as shown in FIG. 6, as axle 38 for the accommodation of wheels 39. Naturally, in this case a traction pole leading to the tractor for the hitching is needed, but it may be designed in any desired manner as known from prior art and thus it is not shown in detail in the drawing.

The accessory means 40 (see FIG. 8) comprises the two lower steering means 41, 42 of the three-point lever system, the accessory frame 3 and a strut 44 leading from the attachment frame 3 to the fastening point 43 for the top steering device at the tractor 4. The accessory frame 3 preferably is a tubular crossbeam, the chopping apparatus 1 with the row cutting mechanism 2 being arranged at its one end, and the two coupling points 45,46 for the connection to the lower steering means 41,42 being arranged at its other end. In the area of the coupling points 41,42 two struts 47,48 extending archlike obliquely, upward and forward are welded to the crossbeam 3. A U-shaped bow is positioned at the upper end of the struts 47,48 is suspended freely pivotable at 49 and forms the strut 44.

A bearing eye 50 is positioned at the strut 44 and used to connect the strut 44 to the fastening point 43 at the tractor.

As shown in FIG. 7 of the drawing, the centerlines 51 of the lower steering means 41,42 intersect with the centerline 52 of the strut 44, which extends thru the two bearing points 43 and 49 at a point P placed behind the coupling points 45, 46.

In order to be able to change the intersecting point P in its position, several perforations 53 are provided for the positioning of the strut 44 to the struts 47,48. This also is advantageous for adjusting the attachment means to different tractors.

The design of the strut 44 as a bow has the advantage that such a bow extends around the clutch jaw 5 of the tractor 4, so that even with the accessory attached for hitching a wagon 6 by means of a hitching pole 7 said jaw is free.

The fastening and/or connection of the harvesting means 1,2 to the attachment means may expediently be executed as shown by way of example in FIG. 9. A connecting part 54 having the shape of a pipe clamp is connected to the harvesting means 1,2. Two fishplates 55 are welded to the crossbeam 3 and they are screwed to the pipe clamp 55.

In order to deposit the harvesting means, depositing supports 56 are placed at the attachment means and depositing supports 57 are placed at the harvesting means 1,2. For the operating position the depositing braces 56, and 57 can be pivoted upward. In addition, if necessary a vertically adjustable supporting wheel 58 may be applied to the attachment means to adjust the cutting height of the harvesting apparatus. In this case the depositing support 56 located in the proximity of the support wheel 58 may be disposed of.

Figure 10:
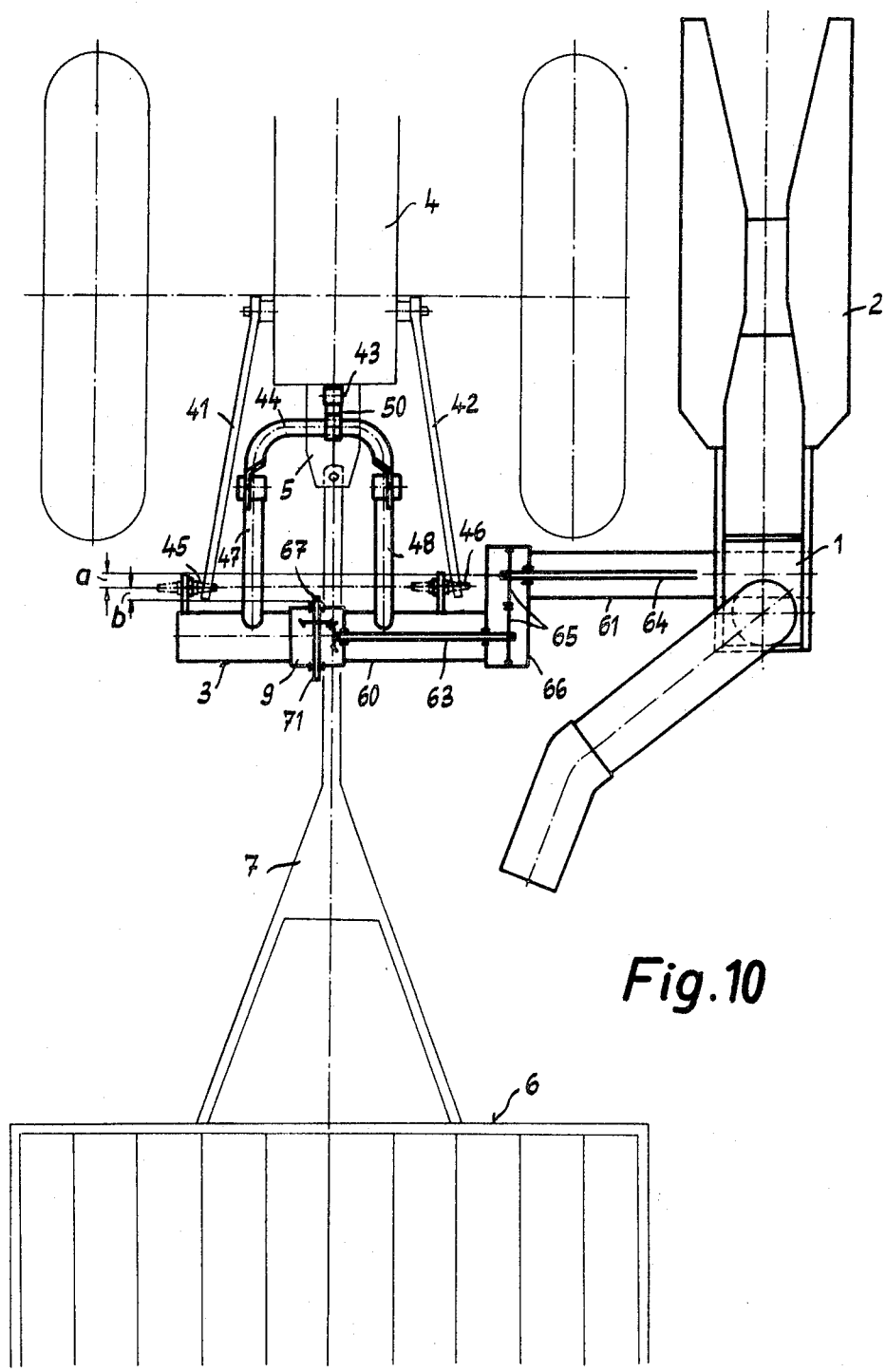
FIG. 10 shows a plan view of an attachment means in a modified design.
Figure 13:
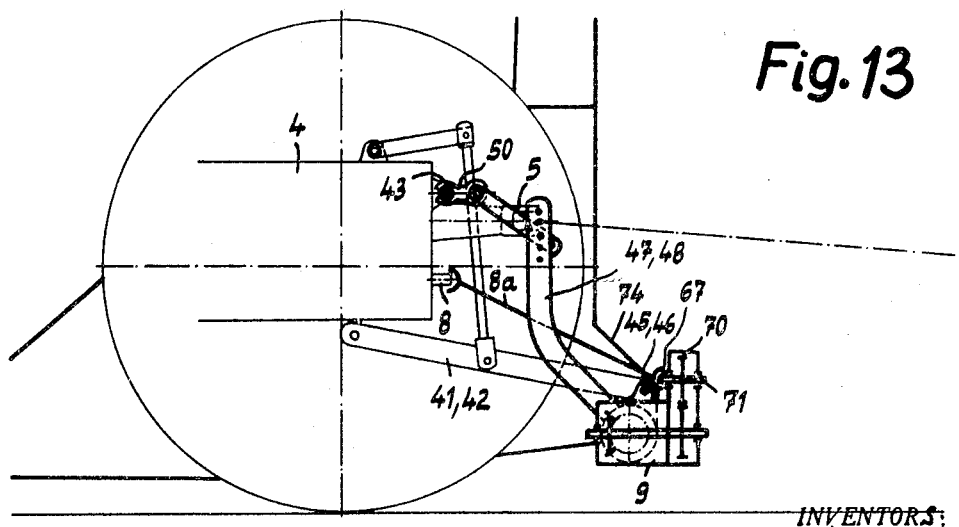
FIG. 13 shows a lateral view of FIG. 12

The attachment means in the embodiment according to FIG. 10 comprises a part 60 of a crossbeam 3 located in the area between the tractor wheels and a part 61 protruding beyond the width of the tractor, the harvesting means 1,2 being fastened to its outer end. The angle gear 9 which laterally steers the drive of the tractor power takeoff shaft 8 via the Cardan shaft 8a (as best seen in FIG. 13) to the harvesting means 1,2 is connected organically to the crossbeam 60. If no special provisions are made, the danger exists in case of a straight crossbeam 3, for example according to FIG. 8, when negotiating curves that the front part of the harvest wagon 6 impacts against the harvesting apparatus, so that according to FIG. 10 the crossbeam part 61 and thus the harvesting means 1,2 is arranged staggered forward and parallel against the crossbeam part 60. Both crossbeam parts 60 and 61 again are designed as tubes, in which the drive shaft 63 leading from the angle gear 9 and the drive shaft 64 leading to the harvesting means 2,2, are positioned. The two shafts 63 and 64 are connected via a spur wheel gear 65 arranged in a housing 66 which at the same time is used to connect the crossbeam parts 60, 61. The spur wheels 65 may just as well be replaced by a chain drive known form prior art. As can be seen from FIG. 10, the attachment of the harvesting means 1,2 to the crossbeam part 60 is so arranged that the drive shaft 64 of the harvesting means 1,2 comes to be located ahead of the clutch bolts 45,46 and the cardan joint shaft connecting pins 67 comes to rest at the angle gear 9 behind the coupling bolts 45,56 for the bottom steering means 41,42 of the three-point lever system, staggered by an amount a and/or b.

Figure 11:
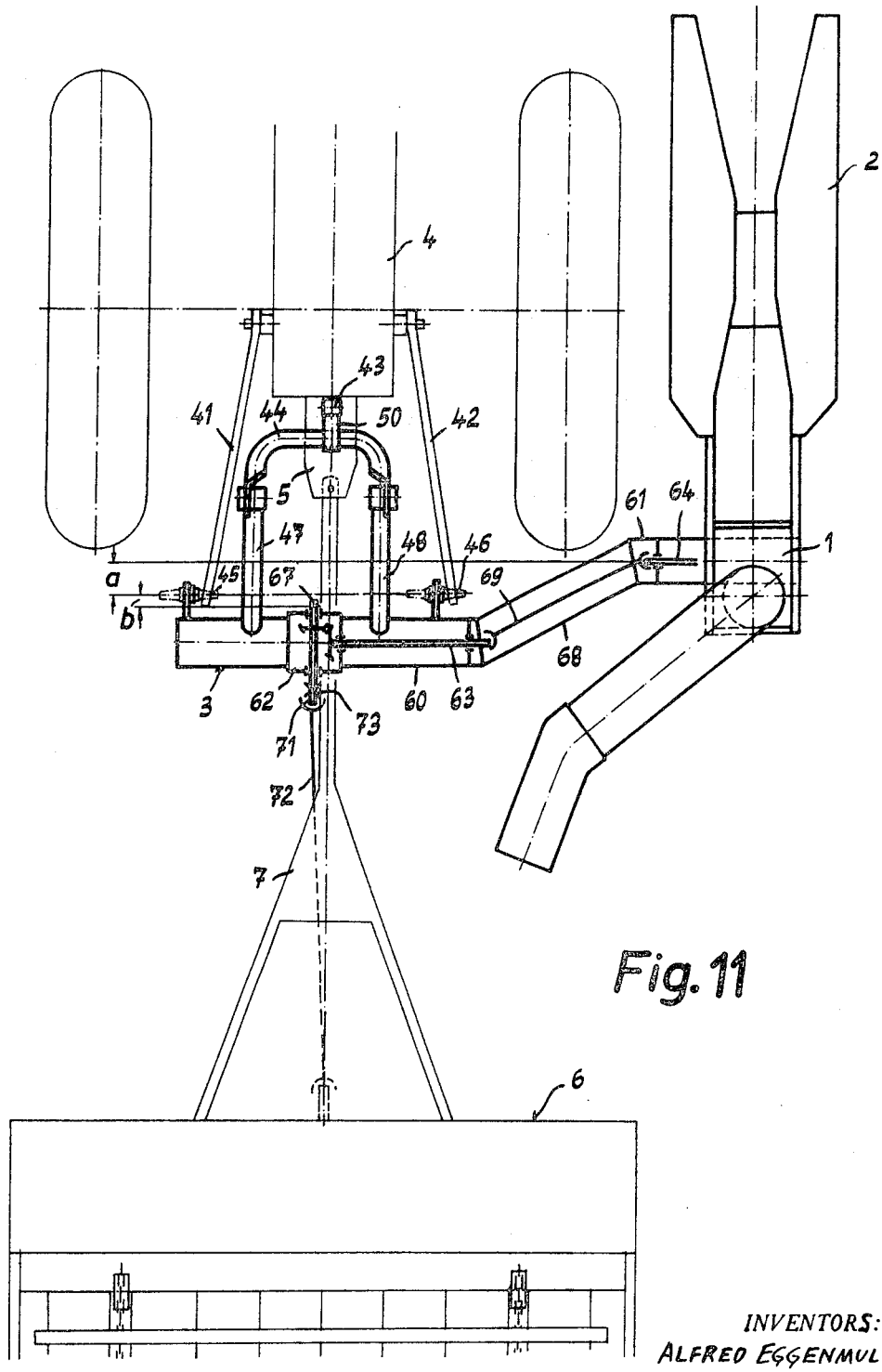
FIG. 11 shows a plan view of another embodiment for the attachment means.

The design according to FIG. 11 is very substantially identical with that of FIG. 10 and only differs by the type of connection of the two crossbeam parts 60 and 61; here both these parts are interconnected by a carrier part 68 bridging the staggering, a cardan joint shaft 69 or the like being positioned in said part 68 for establishing the connection between drive shaft 63 and drive shaft 64.

Figure 12:
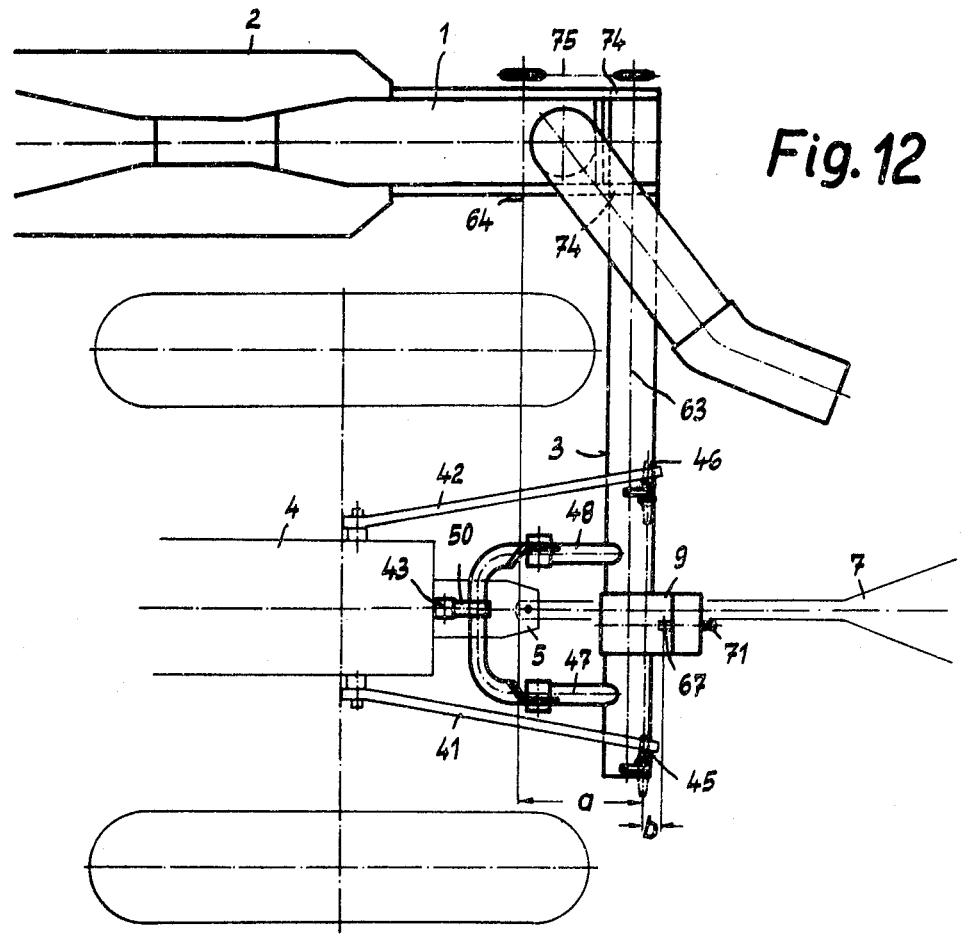
FIG. 12 shows a plan view of an additional embodiment for the attachment means

In the design according to FIG. 12 and 13 the crossbeam 3 again is designed as straight pipe, but the coupling bolts 45,46 are arranged at the crossbeam 3 behind its median longitudinal axis, so that the crossbeam 3 is moved forward as far as possible, that is as far as the rear wheels of the tractor admit it. In order to avoid in this case angling of the universal shaft 8a leading from the tractor power takeoff shaft 8 to the angle gear 9 beyond the admissible range, an intermediate gear comprising a pair of spur wheels 70 is placed at the angle gear 9, whereby the connecting pin 67 for the universal shaft is placed further back, behind the coupling bolts 45,46, so that the universal shaft 8a is given a more level position. The intermediate gear 70 can be removed from the angle gear so that in tractors 4 with lower placed power takeoff shaft 8, where danger of too much angling of the universal shaft does not exist the angle gear 9 can also be propelled directly without the intermittent gear 70.

Figure 15:
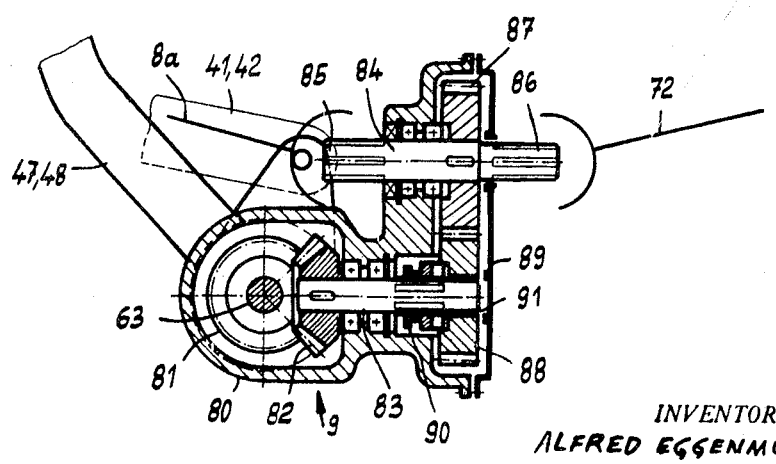
FIG. 15 shows a section thru the gear of the attachment means on an enlarged scale.

A power takeoff stub 71 from which via a universal shaft 72 (as indicated in FIGS. 11 and 15) the scraper bottom of a harvest wagon 6 can be propelled projects out of the housing at the rear side of the angle drive 9 and of the intermediate gear 70; this may be advantageous for example for unloading chopped material because neither the chopping apparatus 1 with the row cutting mechanism 2 nor the wagon need to be removed or hitched differently. Naturally, the drive of the harvest wagon 6 is disconnectable by a switch clutch 73 (as indicated in FIG. 11) or the like, as known from prior art.

If for some reason, for example when the wagon structure impacts in narrow curves against the machine, the harvesting apparatus 1,2 should be placed further in front yet, it may be connected via beams 74 (FIG. 3 and 4) with the crossbeam 3. In this connection the driven shaft 63 of the angle drive 9 may be connected with the drive shaft 64 of the harvesting apparatus 1,2 via a chain drive 75.

Figure 14:
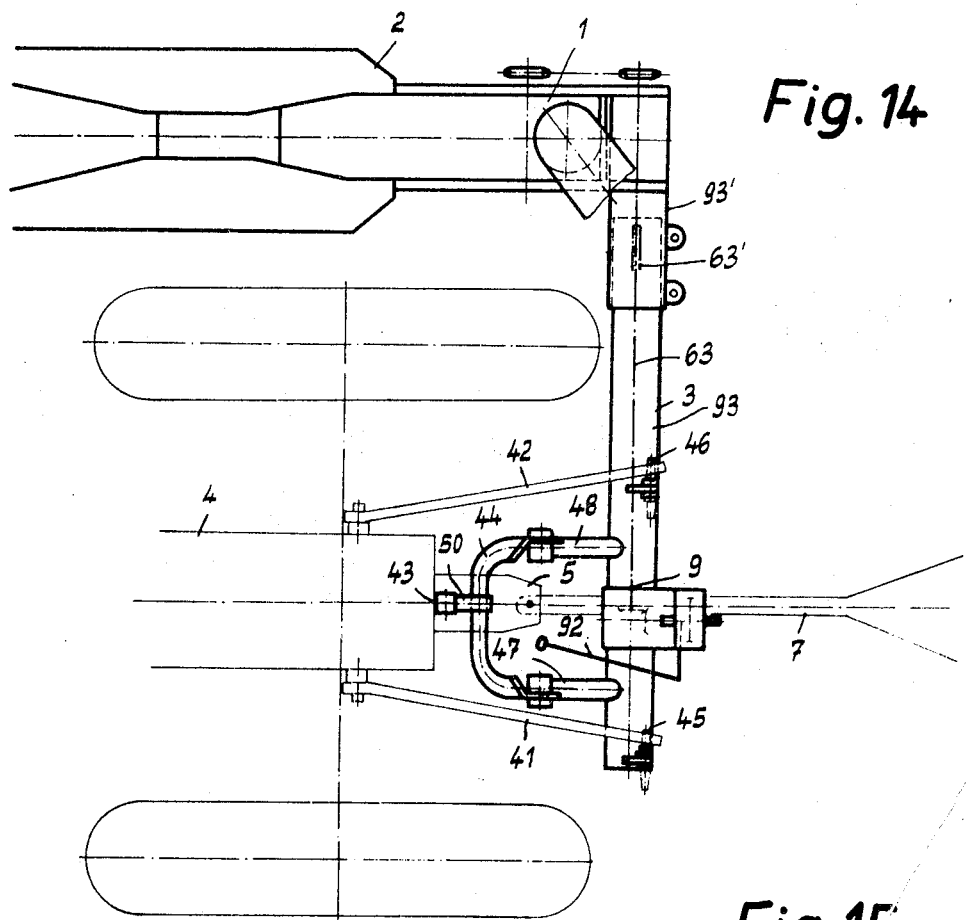
FIG. 14 shows a plan view of an attachment and drive apparatus like in FIG. 12 but in a modified embodiment.

In the embodiment according to FIGS. 14 and 15 the drive of the harvesting apparatus 1,2 again is accomplished from the power takeoff shaft of the tractor 4 via a Cardan shaft 8a (as indicated in FIG. 13) leading to the angle gear 9 organically connected with the crossbeam 3. The angle gear 9 comprises here a housing 80, wherein a bevel gear pair 81,82 is positioned. One bevel gear 81 is arranged on a shaft 63 positioned in the crossbeam 3 designed as hollow beam, which transmits the propulsion from the angle gear 9 to the harvesting apparatus 1,2. The other bevel gear 82 is arranged on a shaft 83 located in the housing. Another shaft 84 is positioned parallel to said shaft 83 in housing 80. At its ends the shaft 84 is designed as a wedge profile, one end 85 being used for the connection of the universal shaft 8a leading from the tractor power takeoff shaft, the other end being used for connecting a universal shaft 72 leading to the harvest wagon 6. Spur gear wheels 87,88, forming an intermediate gear with each other are arranged on both shafts 83,84.

The r.p.m. of the universal shaft 8a is transmitted from the spur gear wheels 87,88 to the bevel gear drive 81,82. If the spur gear wheels 87,88 have identical r.p.m., only the direction of rotation of the bevel gear drive 81,82 is changed by the intermediate gear in relation to a direct drive. However, as shown in FIG. 15, the spur gears 87,88 also may be designed with different numbers of serrations and also as alternating wheels. By exchanging or replacing the changeable gearwheels 87,88, the r.p.m. of the harvesting apparatus 1,2 may be modified. Merely removal of a cover 89 from the gear housing 80 is necessary, in order to gain access to the change gearwheels.

A displaceable jaw 90 is provided on the shaft 83, forming a jaw clutch with the corresponding spur gear 88 or 87 pushed upon the shaft 83. For that purpose the spur gearwheels 87,88 are provided with entrainment cams known as such from prior art and coacting with the jaw 90. The seat provided for the spur gearwheels 87,88 in each case on the shafts 83,84 is of differential diameter, while the spur gearwheels have the same bore to assure exchanging. In order to compensate for the shaft seat diameter a bushing 91 is provided on the shaft 83. The jaw clutch 90 is operable in the usual manner by means of a shift lever 92 arranged at the gear housing, which in an expedient manner may be so designed that it also is accessible from the tractor seat. If the clutch 90 is engaged, as shown in FIG. 15, the harvest wagon 6 and the harvesting apparatus 1,2 are driven simultaneously. With the disengaged clutch the harvesting apparatus 1,2 is stopped; this is advantageous when the wagon is unloaded on the farm.

As shown in FIG. 14, the crossbeam 3 comprises here two parts 93 and 93', part 93' being pushed over part 93 in a telescopelike manner. This telescopic connection makes possible in a simple manner a lateral displacement of the harvesting apparatus 1,2 in relation to the tractor 4 and thus the adaptation of different harvesting means to different tractors and tractor gauges. Both carrier or beam parts 93, 93' may be accomplished with means known from prior art, for example by clamps in a force or form-locking manner. But the clamping connection also may be so designed that both beam parts 93,93' can be rotated against each other, thus offering an additional adjustability for the harvesting machine 1.

In the design of a crossbeam 3 adjustable in length in a telescopelike manner, the transmission shaft leading from the angle gear 9 to the harvesting apparatus 1,2 also must be longitudinally adjustable and consist of two parts 63 and 63'. In that case the connecting end of the shaft 63 positioned in the crossbeam 3 may be designed partly prismlike, for example quadrangularly or hexagonally, and be pushed into a fitting bushing 63'. Prism and bushing form in a known manner a telescopic section making possible longitudinal variations of the shafts 63,63' and thus the connection of the harvesting apparatus 1,2 at different spaces from the median axis of the tractor.

Figure 16:
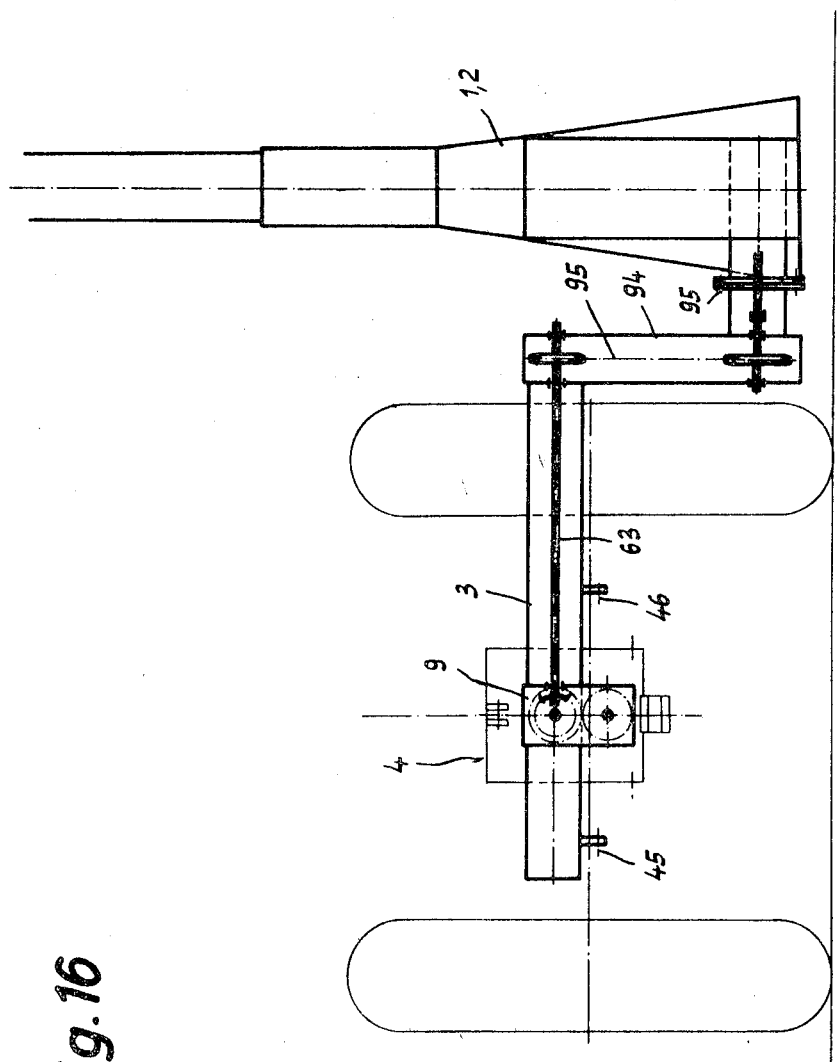
FIG. 16 shows a view of a modified attachment means viewed from the rear.
Figure 17:
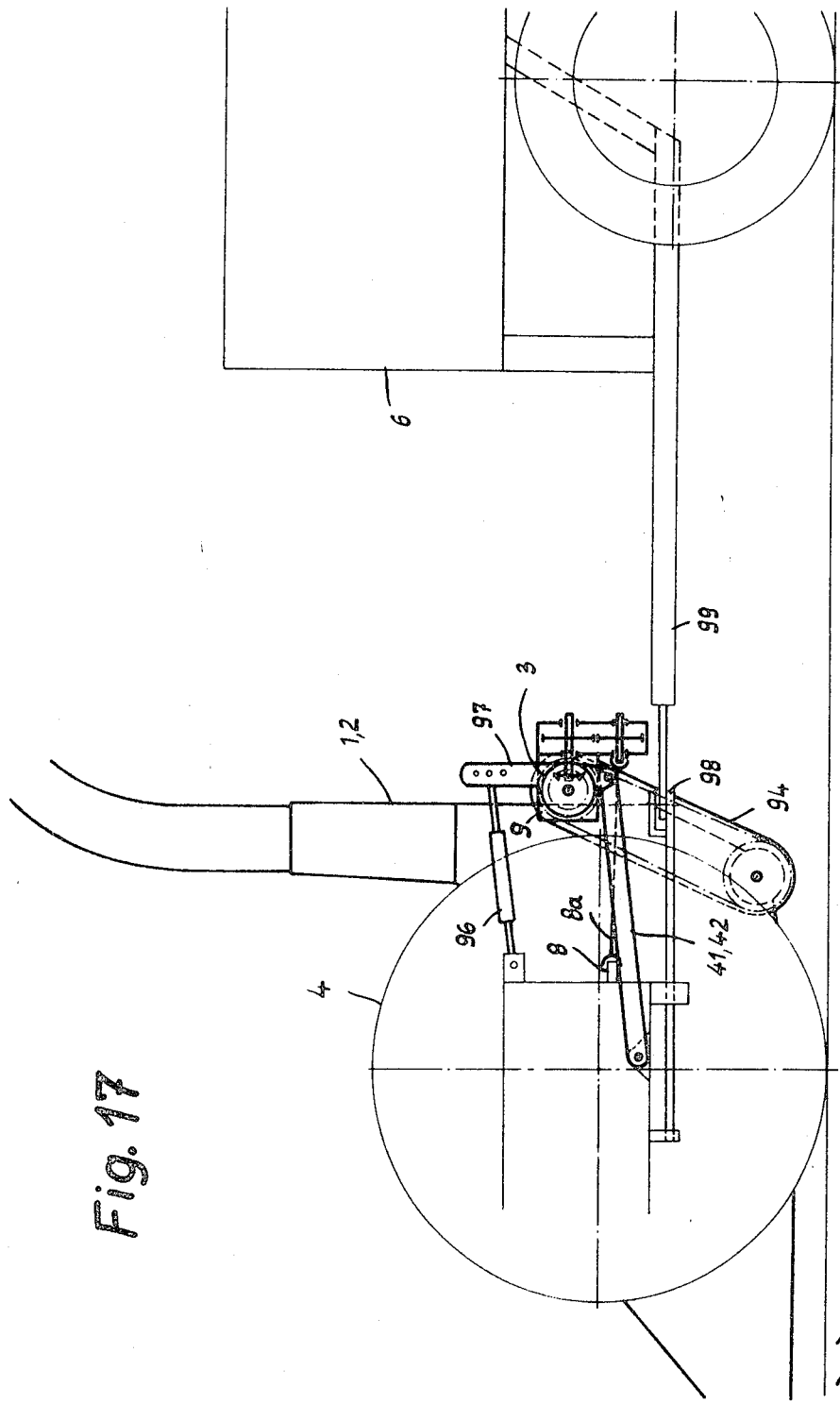
FIG. 17 shows a lateral view of the attachment means according to FIG. 16.

The accessory in the embodiment according to FIGS. 16 and 17 comprises an attachment jack having a crossbeam 3 located in the range of the tractor width and an arm 94 connected with said beam oriented obliquely downward and arranged outside the rear tractor wheel, a flange connection 95 or some other coupling being used to fasten thereon the harvesting apparatus 1,2, for example a field chopper. Again an angle gear 9, laterally reversing the drive from the power takeoff shaft of the tractor 8 to the harvesting apparatus 1,2. A universal shaft 8a, known from prior art leads from the takeoff shaft 8 to the angle gear, and a drive transmission shaft 63 is positioned in the crossbeam 3 designed as a hollow beam, said shafts transmitting the drive via a chain drive 95 or the like located in arm 94 likewise having a hollow profile to the harvesting apparatus 1,2. Moreover, coupling bolts 45,46 are provided at the crossbeam 3 for connection to the bottom steering means 41, 42 of the three-point lever system and a vertical tower 97 is provided for the connection with the top steering means 96.

The rear portion of a tractor 4 indicated in FIGS. 16 and 17 has low positioned traction jaw 98, a harvest wagon 6 being hitched to it via a traction pole 99 specially designed for low hitching.

The length of arm 94 is such that when the harvesting means 1,2 fastened to its lower end is in operating position, that is at the ground, the crossbeam 3 comes to rest above the traction pole 99 of the harvesting wagon 6. Because the traction pole 99 is located relatively low above the ground, the attachment means with the harvesting apparatus 1,2 still can be lifted within the lifting range of the tractor power lift to an adequate transportation height. In the design of the attachment means according to FIGS. 18 and 19 the attachment jack has a crossbeam 3 extending rectilinearly beyond the width of the tractor to the harvesting means 1,2 which with the aid of corresponding fastening means 100 is connected to the crossbeam 3. The fastening means 100 are contemplated at the harvesting apparatus 1,2 at such a height that in operating position of the apparatus the crossbeam 3 comes to rest above the traction pole 99 of the harvesting wagon 6.

A pair of additional coupling bolts 101, 102 for the connection to the bottom steering means may be provided at the crossbeam 3, and additional perforations 103 may be provided at the tower 97 at a corresponding distance for connection with the upper steering means 96. This offers the possibility of connecting the attachment jack at different height levels to the three-point leverage system, making possible thereby the hitching of a wagon with a traction pole 99 to the lower traction jaw 98 and of a wagon with a normal traction pole 7 to the upper traction jaw 5. In the former case the crossbeam 3 comes to rest above the traction pole 99, while in the latter case, as shown in dots and dashes in FIGS. 18 and 19, the beam is placed in a known manner below the traction pole 7. Additional fastening means 104 are required of course in this case too at the harvesting apparatus if they are to be used for both types of harvesting wagons.

Figure 18:
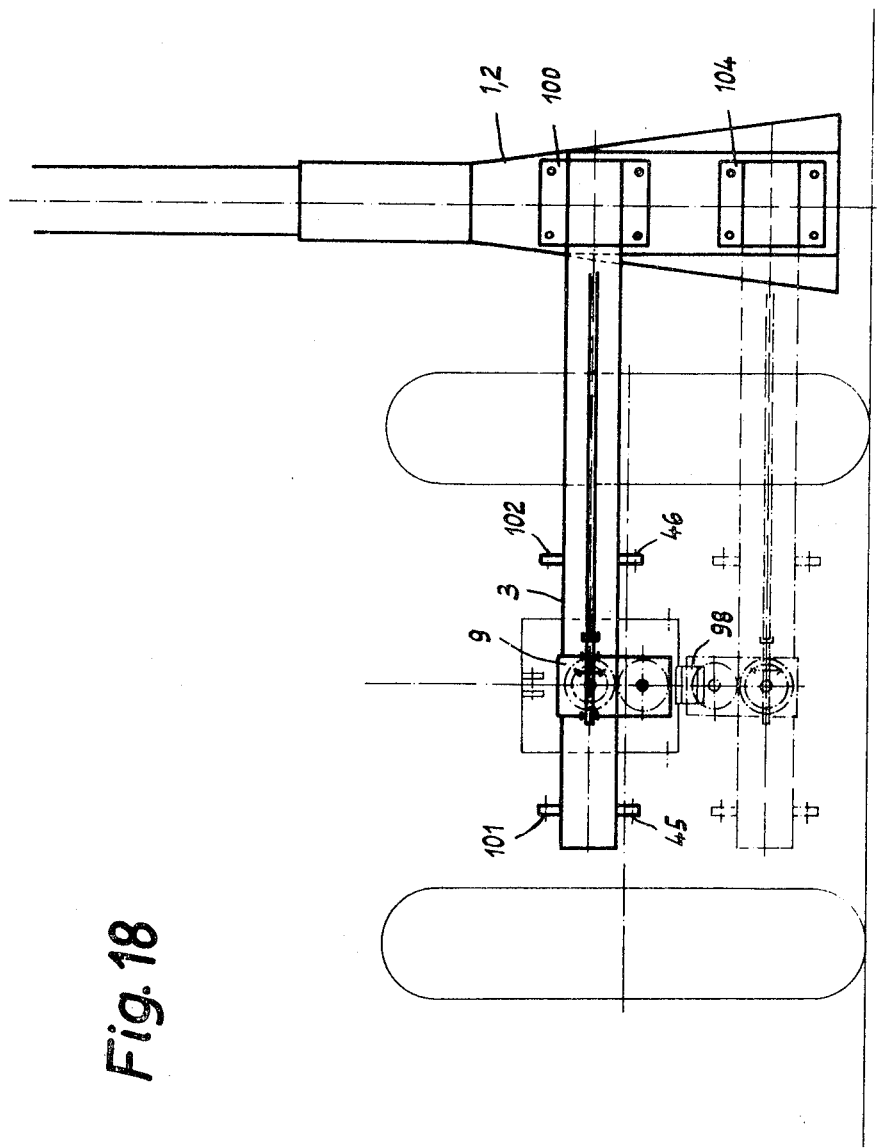
FIG. 18 shows the view of another embodiment of the attachment means viewed from the rear.
Figure 19:
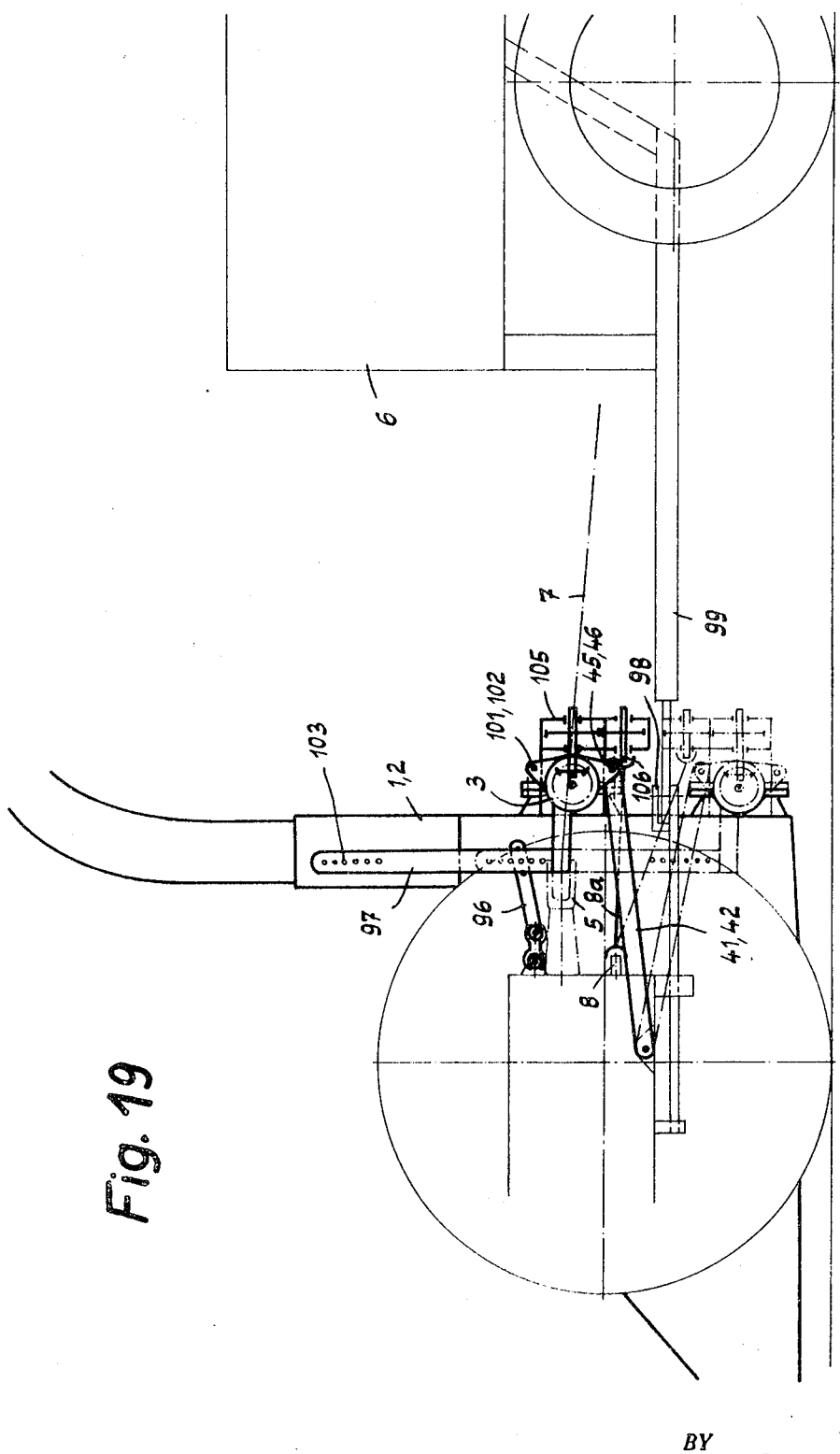
FIG. 19 shows a lateral view of the attachment means according to FIG. 18.

In the attachment means according to FIGS. 18 and 19 an intermediate gear 105 comprising a pair of spur gears is assigned to the angle gear 9, said intermediate gear 105 being connectable normally to the angle gear 9 as shown in FIGS. 16 and 17 or in a position pivoted by 180°, as indicated in FIG. 19 by dots and dashes. In the first case the cardan shaft connecting pin comes to rest below, and in the second case above the crossbeam 3. This way too much of an angling of the cardan shaft 8a in both attachment positions of the attachment jack is avoided.

Figure 20:
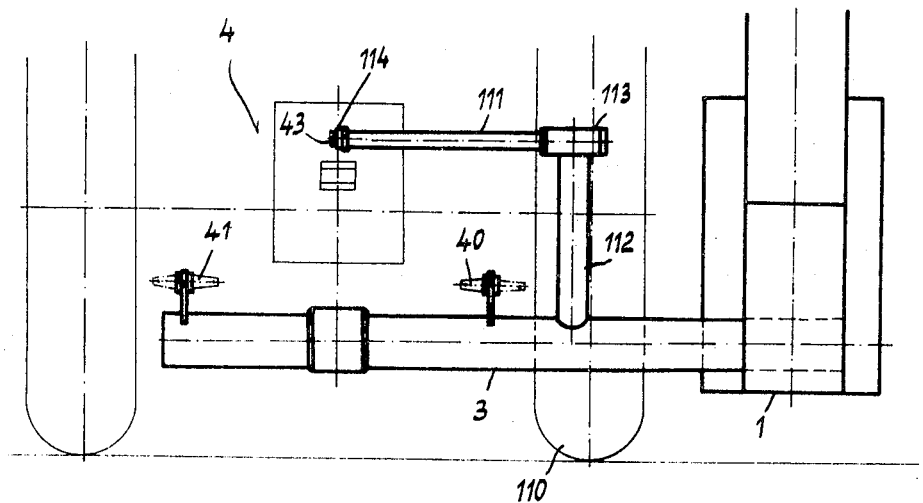
FIG. 20 shows a view of a modified attachment means from the rear.
Figure 21:
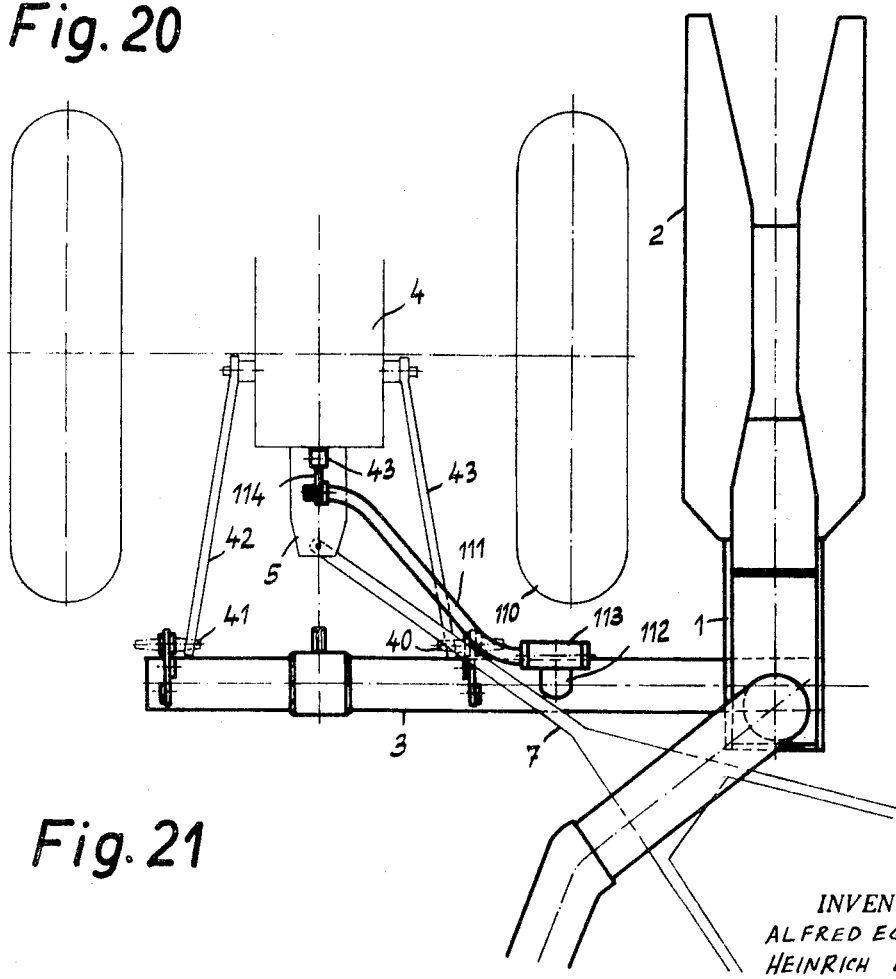
FIG. 21 shows a plan view of the attachment means of FIG. 20.

FIGS. 20 to 29 show further modifications of the attachment means. The crossbeam 3 used to attach the field chopper 1,2 again is designed as hollow beam and has two coupling bolts 40,41 for connection to the lower steering means 42,43 of the three-point leverage system. The coupling 112 used for the connection of the top steering means 111 is located outside the coupling bolt 40, approximately in the range of the right rear tractor wheel 110. The top steering means 111 is articulated on the one hand via a bearing 113 to the coupling 112 and on the other hand via a bearing eye 114 to the connecting point 43 at the tractor 4. As shown in FIG. 21, the coupling 112 is placed very far toward the outside, so that the traction pole 7 corresponding to a farm wagon can pivot sufficiently side to side, so that if necessary narrow curves, for example when turning around at the end of the field, can be negotiated. The shape of the top steering means 111 and its connection to the accessory and the tractor side is so arranged that the lift struts leading from the lower steering means 42 to the lift arms of the tractor power lift have enough room for using the power lift for releasing the accessory.

According to FIGS. 20 and 21 the bearing eye 114 is connected via a serrated disk or the like to the steering device 114 pivotably and lockably in a form-locking manner. FIGS. 22 and 23 shown a design of the top steering means 111 where one bearing eye 115 is fastened to a strut 117 provided with a serration 116. The serration 116 engages into a corresponding counterplate 118 and is maintained form-lockingly at the top steering means 111 by a screw 119. After removal of the screw 119 the bearing eye 115 along with the strut 117 may be expanded and/or retracted in order to so adjust the desired length of the steering means. Naturally, the pivotability of the bearing eye 115 may also be maintained in this design by designing the plate 118 on the opposite side as a serrated disk with a serration 120 and by connecting it with a corresponding counterpart 121.

FIGS. 24 and 25 show a possibility for simply varying the height of the coupling. The coupling connected to the crossbeam 3 thereby comprises two coupling parts 122,123 which can be telescoped into each other. By means of a usual clamping means 124 the adjusted length of the coupling 122,123 may be fixed. If necessary the coupling part 123 may, as shown in FIG. 23, be of a deflected design. By turning the coupling part 123 in coupling part 122 an adjustment of the position of the bearing 113 and thus of the point of articulation for the top steering means 111 is achieved thereby.

Further possibilities of the point of articulation on the accessory side are shown in FIGS. 26 and 27, where the bearing 125 used to connect the top steering means is fastened via threaded bands 126 to a plate 128 equipped with oblong holes 127. The plate 128 is fixedly connected to the coupling 112.

FIGS. 28 and 29 show a U-shaped steering means consisting of two struts and articulated with its one end at the point of articulation 129 at the tractor 4 and with its legs 130,131 to the couplings 132,133 arranged at the crossbeam 3. Couplings 132,133 are outside the coupling points 40,41. This design is particularly appropriate for heavy accessories to be connected.

Figure 30:
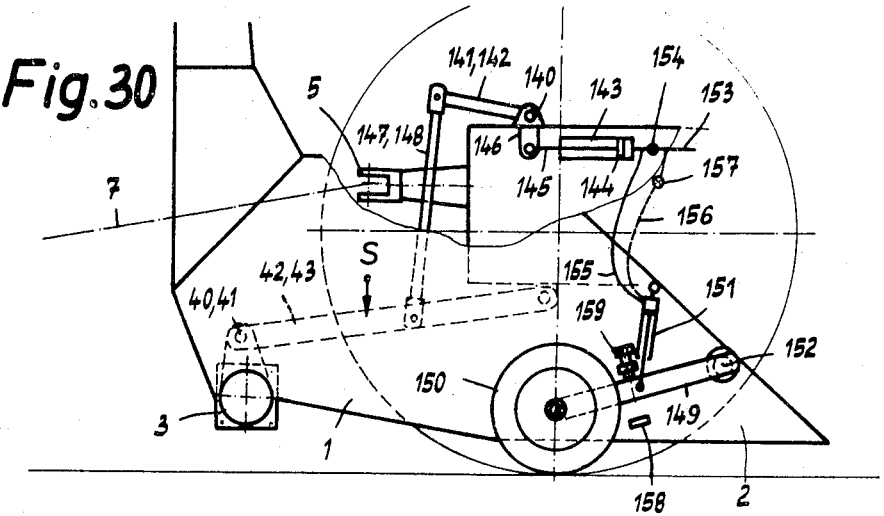
FIG. 30 shows a lateral view of another attachment means for the field chopper.
Figure 31:
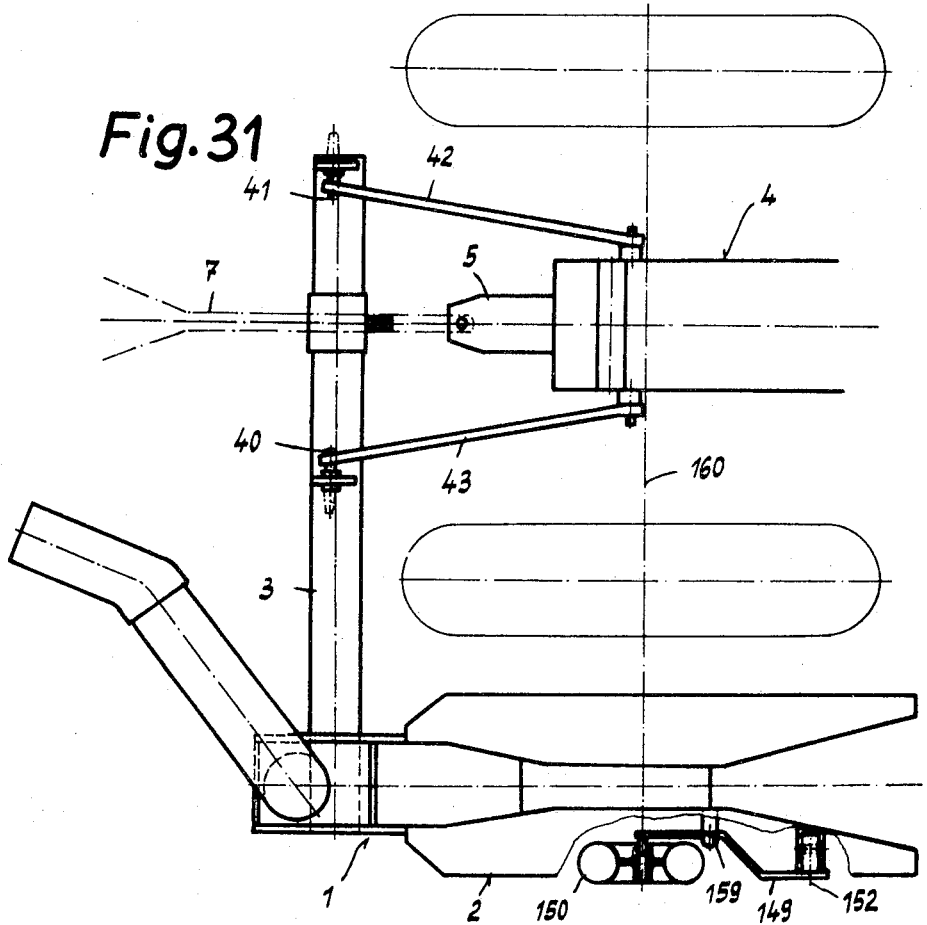
FIG. 31 shows a plan view of the embodiment of FIG. 30.

FIGS. 30 and 31 show a hydraulic power lift installation at a tractor 4, comprising a lift shaft 140 with both lift arms 141,142, a hydraulic lift cylinder 143 with a piston 144, operating with its piston rod on a lever 146 fixedly connected to the lift shaft 140.

The lower steering means 42,43 of a customary three-point steering lever system are articulated at both lift arms 141,142, by means of lift bars 147,148. A harvesting apparatus 1,2 operating laterally adjacent to the tractor is attached at the lower steering means 42,43 by means of coupling bolts 40,41 and a crossbeam 3. Here the accessory is mounted without using the top steering means in order to avoid obstructing the area needed for hitching the pole 7 of a wagon to the tractor traction jaw 5. A supporting wheel 150 is positioned pivotally to the harvesting apparatus 1,2 via a supporting wheel arm 149. The supporting wheel 150 and/or the supporting wheel arm 149 may be pivoted around the bearing shaft 152 by means of a hydraulic operating cylinder 151 arranged between the frame of the apparatus 1,2 and the supporting wheel arm 149.

During the lifting oil is conveyed into the lift cylinder 143 by means of a pump not shown, thereby the piston 144 is displaced in the cylinder 143 and pivots with its piston rod 145 the lift shaft 140 with lift arms 141 and 142, and thus lifts via the lift bars 147, 148 the lower steering means 42,43. If with the aid of a valve 154 the oil delivery to the lift cylinder 143 is shut off, the pump delivers into an oil tank not shown, while the oil already ingressed into the stroke or lift cylinder 143 holds the piston 144 in its shifted position and thus the steering means 42,43 in lifted position. If a harvesting apparatus 1,2 is coupled to the bottom steering means 42,43 of the three-point lever system, its weight bears down on the lifted bottom steering means 42,43 and thus, because by means of the lift bars 147,148 the lift arms 141,142 and the lift shaft 140 they are connected with the piston 144, upon the piston 144, so that the oil present on the pressure side of the stroke cylinder 143 is under pressure. The operating cylinder 151 arranged at the apparatus 1,2 is connected with the pressure side of the stroke or lift cylinder 143 by means of a line 155, the same pressure prevailing in the operating cylinder 151 as in the pressure side of the cylinder 143. This pressure in the operating cylinder 151 caused by the weight of the apparatus 1,2 is utilized to pivot the supporting wheel 150 at the apparatus 1,2.

In consideration of the force for lifting the rear end of the apparatus 1,2 by the lower steering means 42,43 with the aid of the lift cylinder 143, and of the force for lifting the front end of the apparatus 1,2 by the supporting wheel 150 by means of the operating cylinder 151 toward the lift cylinder 143, the diameter of the operating cylinder 151 may be so determined that upon operation of the valve 154 the apparatus 1,2 is lifted at the same speed parallel from the ground. However, the diameter of the operating cylinder 151 may also be so adapted to the lift cylinder 143 that the apparatus 1,2 leads during the lifting with its front end, in other words the front tip lifts off the ground before the rear apparatus end, which may be of advantage in devices built far to the front, like in a field chopper with a row cutting mechanism.

However, the line 156 leading to the operating cylinder may also be connected to line 153 ahead of valve 154, as shown in broken lines in figure 30 and an additional valve 157 may be provided. Thus the rear apparatus end can be lifted up or out by operating valve 154 and the front end may be lifted up or out by operating valve 157, and both operations may be carried out independently of each other.

Naturally, such a valve may also be introduced into the line 155 leading to the pressure side of the lift cylinder 143, whereby the moment of the lift of the front end of the apparatus may be selected differently.

In order to limit the pivoting movement of the supporting wheel arm 149, stops 158,159 are provided at the apparatus 1,2. Stop 159 is designed as a setscrew by which the position of the apparatus above the ground can be adjusted. The supporting wheel 15 is located ahead of the center of gravity S of the apparatus in the embodiment represented in the drawing it is approximately in the extension of the rear wheel tractor axle 160.

Figure 32:
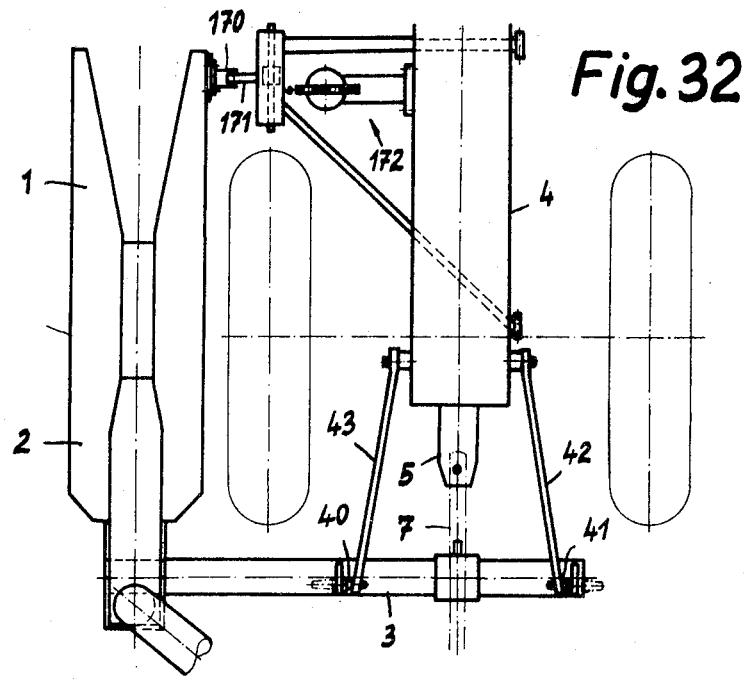
FIG. 32 shows a schematic presentation, viewed from the top, of the rear part of a tractor with a harvesting apparatus operating laterally adjacent to the tractor.
Figure 33:
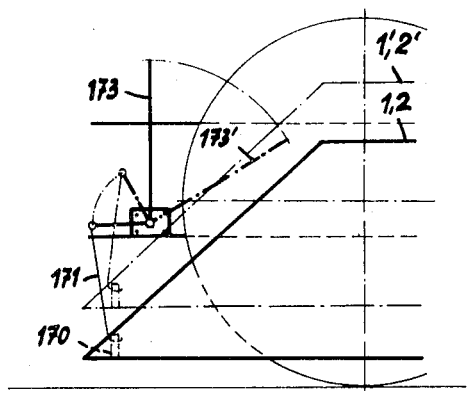
FIG. 33 shows a lateral view of an embodiment for the lifting of the anterior apparatus end.
Figure 34:
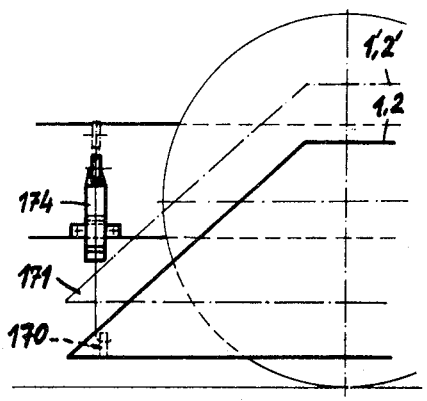
FIG. 34 shows another embodiment for the lifting of the anterior apparatus end.

According to FIGS. 32–34 a crossbeam 3 is articulated at a tractor 4 at the lower steering means 42,43 of a usual three point lever system via coupling bolts 40,41. The crossbeam 3 extends beyond the tractor width and carries at its outer end a harvesting means 1,2 extending in the main in a narrow elongated design from the crossbeam 3 forward in the longitudinal direction of the tractor. The apparatus 1,2 with the crossbeam 3 thus is merely articulated at the rear end at the bottom steering means 42,43, so that the area required for hitching the pole 7 of a trailer vehicle is completely free at the tractor traction jaw 5, that is to say it is not obstructed by the top steering means of the three-point lever steering means. The front end of the apparatus is connected via a bearing 170 and a corresponding connecting part 171, for example a bar or chain, with the release lever system 172 of the tractor mower mechanism, according to the invention. The parts 170, 171 used for the connection with the release lever system 182 may be designed differently depending on the type of the harvesting apparatus, brand of tractor or mower mechanism, and can be adjusted at the apparatus in position and length in accordance with the prevailing requirements.

In tractors and harvesting apparatus where the space is sufficient, the mowing beam also may be left at the tractor and the front end of the apparatus 1,2 may be connected to the mower mechanism shoe. That way a simple attachment and release apparatus is obtained without any changeover at the tractor for a harvesting apparatus operating laterally adjacent to the tractor. There the rear end of the apparatus is lifted or released by the tractor power lift and the front end is lifted by the mower mechanism release. In case of a mechanical mower mechanism release with the aid of a lever 173 the valve of the tractor power lift and the lever 173 must be maneuvered into position 173′ when the apparatus 1,2 is to be lifted into the position shown with dots and dashes. If a hydraulic cylinder 174 is provided for the mower mechanism release it may be operated wither separately with the valve provided therefor or with the hydraulic installation of the tractor power lift a coupling may be effected so that the apparatus is lifted in the front and back uniformly parallel from the ground.

According to FIG. 35 two drum choppers 1,2 and 1′2′ with row cutting mechanism are fastened to a crossbeam 3 extending laterally over and beyond the width of the tractor 4 in a row width corresponding for example to the distance of sweet corn. The drum choppers 1,2 and 1′, 2′ are connected with their row cutting mechanism into an inseparable unit, whereby the housing accommodating the components of the row cutting mechanism and of the chopper art is designed as self-supporting frame. According to the embodiment as per FIG. 35 the crossbeam 3 is fastened pivotable around a vertical bolt 180 at a three-point panel 181, which is provided with coupling bolts 182,183 for connection to the bottom steering means 184,185 and connecting means for the upper steering means of the three-point leverage system not represented in the drawing. The drive of the drum choppers 1,2 and 1′,2′ is accomplished from the tractor power takeoff shaft via a universal shaft 186 leading to an angle gear 187 fastened to the crossbeam 3, from where the revolutions are transferred to the drum choppers via a shaft 188 located at the crossbeam 3 via chain drives 189 and chain wheels 190. To adjust the drum choppers 1,2 and 1′2′ to the row width of the rows of plants to be harvested, the fastening on the crossbeam 3 may be so designed that it is possible to change the mutual distance between the drum choppers 1,2 and 1′,2′, that is to displace them of the cross beam 3. In that case the chain wheels 190 located on shaft 188 are also displaced. A supporting wheel 191 designed as trailing wheel is fastened to the end of the crossbeam 3. During the work the crossbeam 3 is fastened to the three-point jack 181 by means of a prong 192. For transportation, for example on public roads after pulling the prong 192 the crosssbeam 3 can be pivoted along with the drum choppers 1,2 and 1',2' fastened thereon into the position shown in dots and dashes in FIG. 35 behind the tractor.

Figure 37:
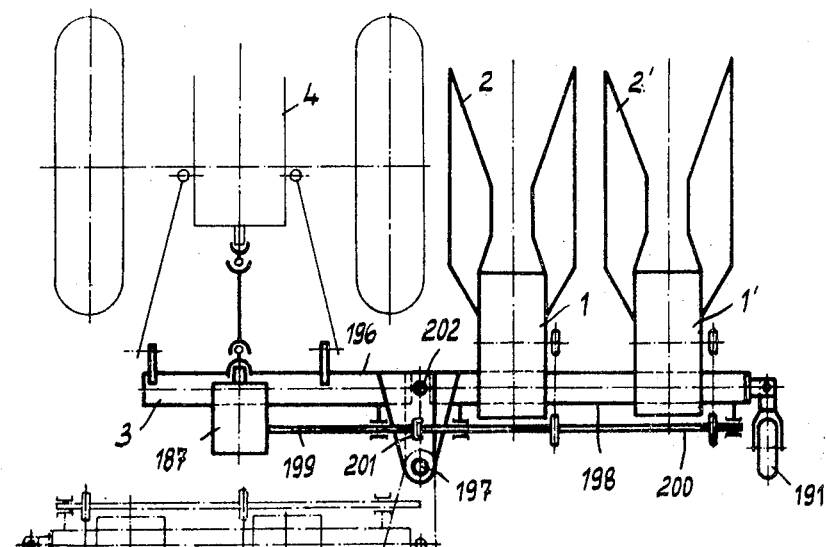
FIG. 37 shows a two-row drum field chopper with a different design of the attachment means.
Figure 38:
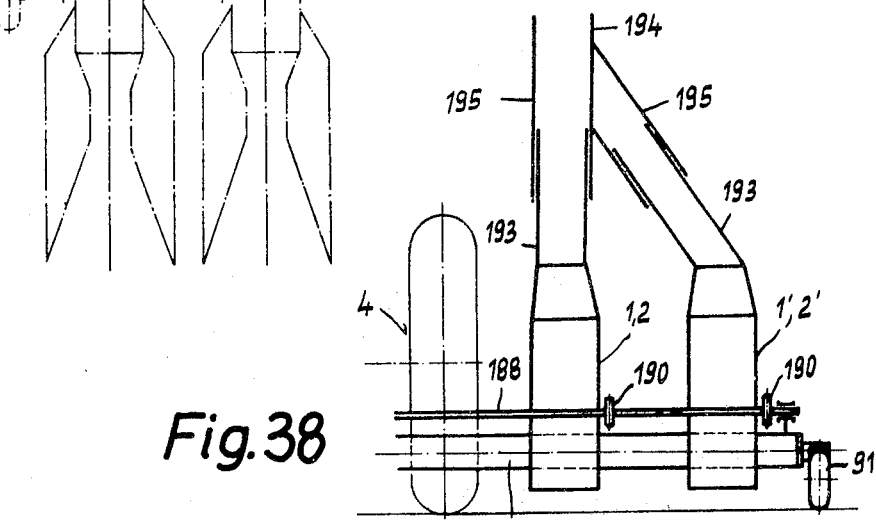
FIG. 38 shows a different embodiment for the discharge studs and the discharge knee.

The discharge studs 193 may converge, as shown in FIGS. 36, 38 and 43, into a discharge elbow 194. The discharge elbow may thereby be placed symmetrically to the individual choppers 1,2, and 1',2', as shown in FIGS. 36 and 43, or asymmetrically as according to FIG. 38 and it is telescopically displaceable on the individual discharge studs 193, by pushing the individual extensions 195 at the discharge elbow 194, over the discharge studs, since the elbows have a larger internal width. If the choppers 1,2 and 1'2' are further pulled apart, they pull the discharge studs 193 out of the extensions 195 of the discharge elbow 193 and conversely they telescope again. For adjustability of the choppers 1,2 and 1',2' the discharge elbow may also be connected via flexible intermittent parts not shown in the drawing to the individual discharge studs, which can yield according to the path of displacement. In the embodiment according to FIG. 37 the crossbeam 3 consists of two parts namely of a part 196 connectable directly to the three-point frame of the tractor and a part 198 pivotable thereon around a vertical pin 197 to which the drum choppers 1,2 and 1',2' are fastened. The drive shaft 188 also comprises two parts, namely parts 199 and 200, removable connected via a jaw clutch 201 or the like as known from prior art. In operating position both crossbeam parts are fixedly interconnected via a prong 202 or the like. After separating the prong 202 the carrier part 198 can be pivoted with the drum choppers 1,2 and 1',2' around the pins 197 into the transporting position shown in 37 in dotted lines, behind the tractor.

By additional loosening of the pin 197 it also is possible to completely dismount the apparatus 1,2 and 1',2' whereby the carrier part 196 remaining at the tractor is free for attaching some other harvesting apparatus.

Figure 39:
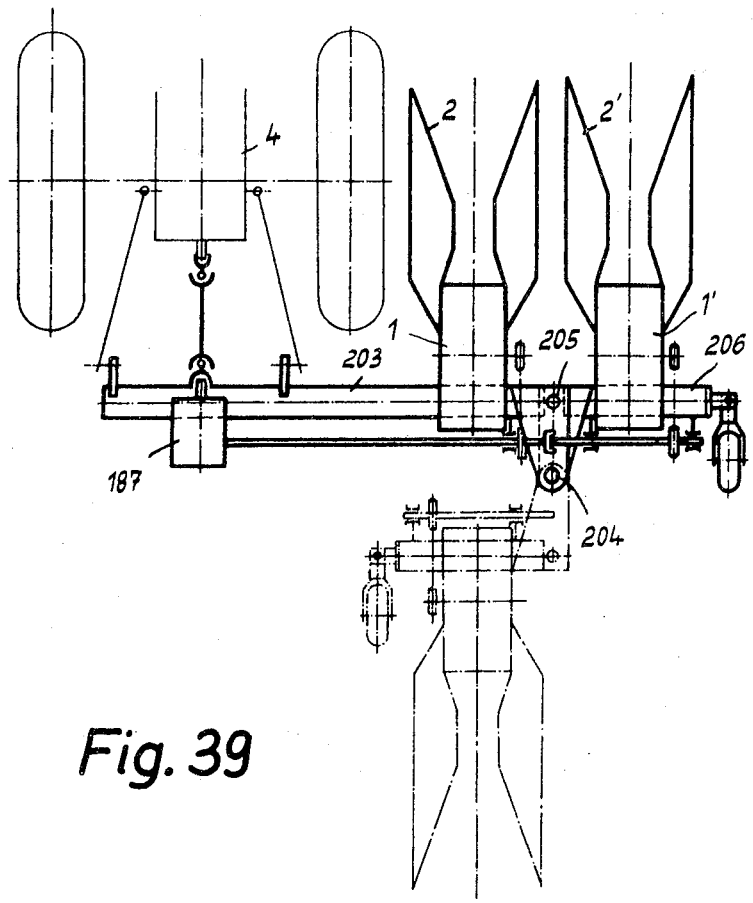
FIG. 39 shows a two-row drum field chopper with another embodiment for the discharge means.

FIG. 39 shows an embodiment with a two-part crossbeam, whereby the part 203 connectable to the three-point leverage system of the tractor 4 is longer than the crossbeam part 196 according to FIG. 37. There one drum chopper 1,2 is fastened to the carrier part 203 and the other one 1',2' is fastened to a carrier part 206 pivotable around a vertical pin 204 and lockable by a prong 205. After pulling the prong 205 the carrier part 206 can be pivoted into the position shown with dots and dashes in FIG. 39, along with the drum chopper for transportation. This embodiment also makes it possible to use the field chopper optionally in one or two rows, by removing the outer drum chopper 1',2' by loosening the pin 204 and the prong 205, or by attaching it. The drive shaft 188 is designed in this embodiment just as in the embodiment according to FIG. 37.

Figure 40:
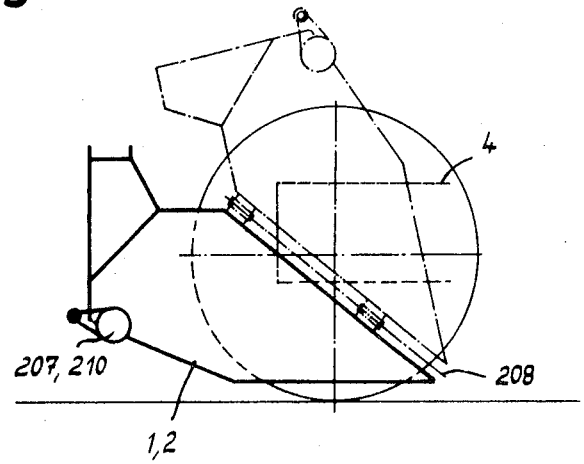
FIG. 40 shows an embodiment for a two-row drum field chopper in lateral view, where the outer chopper can be hinged upward for transporting.
Figure 41:
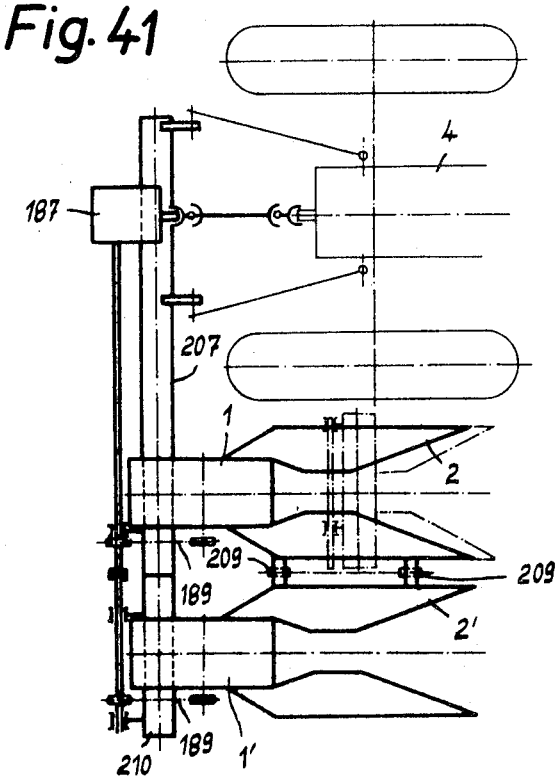
FIG. 41 shows a plan view to FIG. 39.

In the embodiment according to FIGS. 40 and 41 a drum chopper 1,2 is fastened to a carrier part 207 just like in the embodiment according to FIG. 39, while the other drum chopper 1',2 can be pivoted upward for transportation around a shaft 208 located in driving direction so that it will assume the position shown in FIG. 40 in dots and dashes.

In this connection both drum choppers 1,2 and 1',2' are interconnected by hinges 209 or the like. The carrier part 210 used for fastening the outer drum chopper 1',2' is connected in an articulated manner with the carrier part 207 in order to make possible this upward pivoting.

FIGS. 40 and 43 show a trailer field chopper where the individual drum choppers 1,2, 1'2', 1'',2' are fastened to a carrier 211, bearing down via two wheels 212 against the ground, and hitched via a laterally outwardly pivotable traction pole 213 to the field rail 214 of the tractor 4. The drive conditions are identical with those of the embodiments according to FIGS. 35 to 41.

FIGS. 44 and 45 shown an embodiment how to attach the field chopper according to the invention, 1,2, also ahead of the tractor 4. There the drum choppers 1,2, 1',2', 1'',2'' are fastened to a crossbeam 215 articulated via a vertically pivotable steering means 216 to the front traction claw 217 of the tractor 4. The crossbeam 215 is held firmly via a stabilizing bar 218 leading to the rear field rail in its position transversely to the driving direction. For vertical adjustment and lifting out of the field chopper, the carrier 215 is supported against the ground by means of supporting wheels 219. The adjustment and/or lifting of the harvesting apparatus into transport position is accomplished by hydraulic cylinders 220 which engage at the parallelogram steering means 221 used to guide the supporting wheels 219. The drive of the field chopper attached ahead of the field chopper may be accomplished in the usual manner from the front power takeoff shaft of the tractor. If the tractor has no front power takeoff shaft, the drive also may be accomplished via a transmission shaft 222 from the rear power takeoff shaft with the aid of a corresponding plug-on gear. In the design shown in FIGS. 44 and 45 the field chopper also may be attached without any problem to the two arms of a front loader. In that case the stabilizing bar 218, the steering means 216 and the vertically adjustable supporting wheels with the hydraulic cylinder become superfluous.

Figure 46:
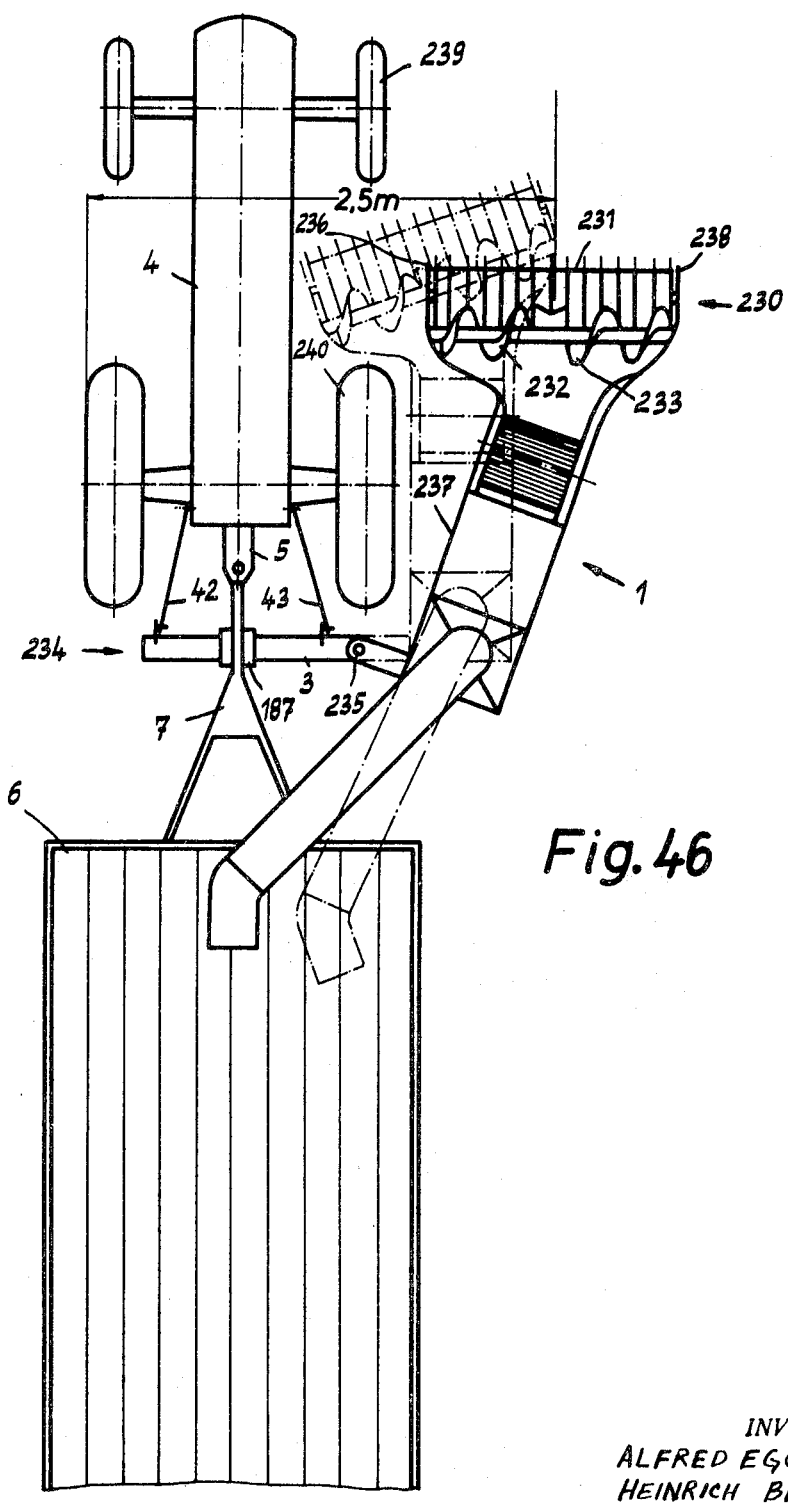
FIG. 46 shows a field chopper attached to the tractor with a wide accommodation device.

In FIG. 46 a field chopper designed as drum chopper 1 is shown with a wide accommodation apparatus 230 comprising the accommodation drum 231 designed in the usual manner and two transverse conveyor worms 232 and 233 arranged between the retraction or pickup means of the chopper 1 and the accommodation drum 231, and conveying toward the center.

The material spread widely on the ground is picked up by the accommodation drum 231 and fed by the transverse worm conveyors 232,233 to the pickup means of the chopper 1 of compact design.

The field chopper 1 is attached to the tractor via an attachment frame 234 to the three point suspension of the tractor 4 of which only the two lower steering means 42,43 are shown and it is pivotable and lockable with reference to the attachment frame 234 and thus to the tractor around a vertical shaft 235. The attachment frame 234 is in a plane below the clutch jaw or coupling jaw 5, so that a wagon 6 can be hitched behind the tractor 4 directly via its traction pole 7.

The drive of the field chopper 1 is accomplished in the above described manner from the power takeoff shaft of the tractor via a universal shaft not represented, an angle drive 187 and the other gear parts arranged at the cross beam 3 of the attachment frame 234 and leading to the field chopper 1.

The drum chopper 1 with its preceding wide accommodation apparatus 230 (FIG. 46) is outside the tractor gauge in operating position in an oblique position oriented in a direction leading forward and away from the tractor. The accommodation apparatus 230 is arranged at the chopper at an angle corresponding to this oblique position so that in operating position it has the transverse position in relation to the operating direction and necessary for the operation of the accommodating drum. In addition the accommodation device 230 has an eccentric position in relation to the chopper 1, whereby the end 236 of the accommodation drum 231 located on the tractor side protrudes farther beyond the sidewall 237 of the chopper 1 than the opposite end 238. This makes it possible to pivot the chopper 1 with its accommodation apparatus 230 from the oblique position required for the operation around the vertical shaft 235 for the transportation toward the tractor 4, into the position represented in broken lines in the drawing. In inwardly pivoted position part of the accommodation apparatus comes to rest between the front wheel 239 and the rear wheel 240 of the tractor, and the total width of the tractor and inwardly pivoted field chopper does not exceed the maximum of 2.5 meters.

Figure 47:
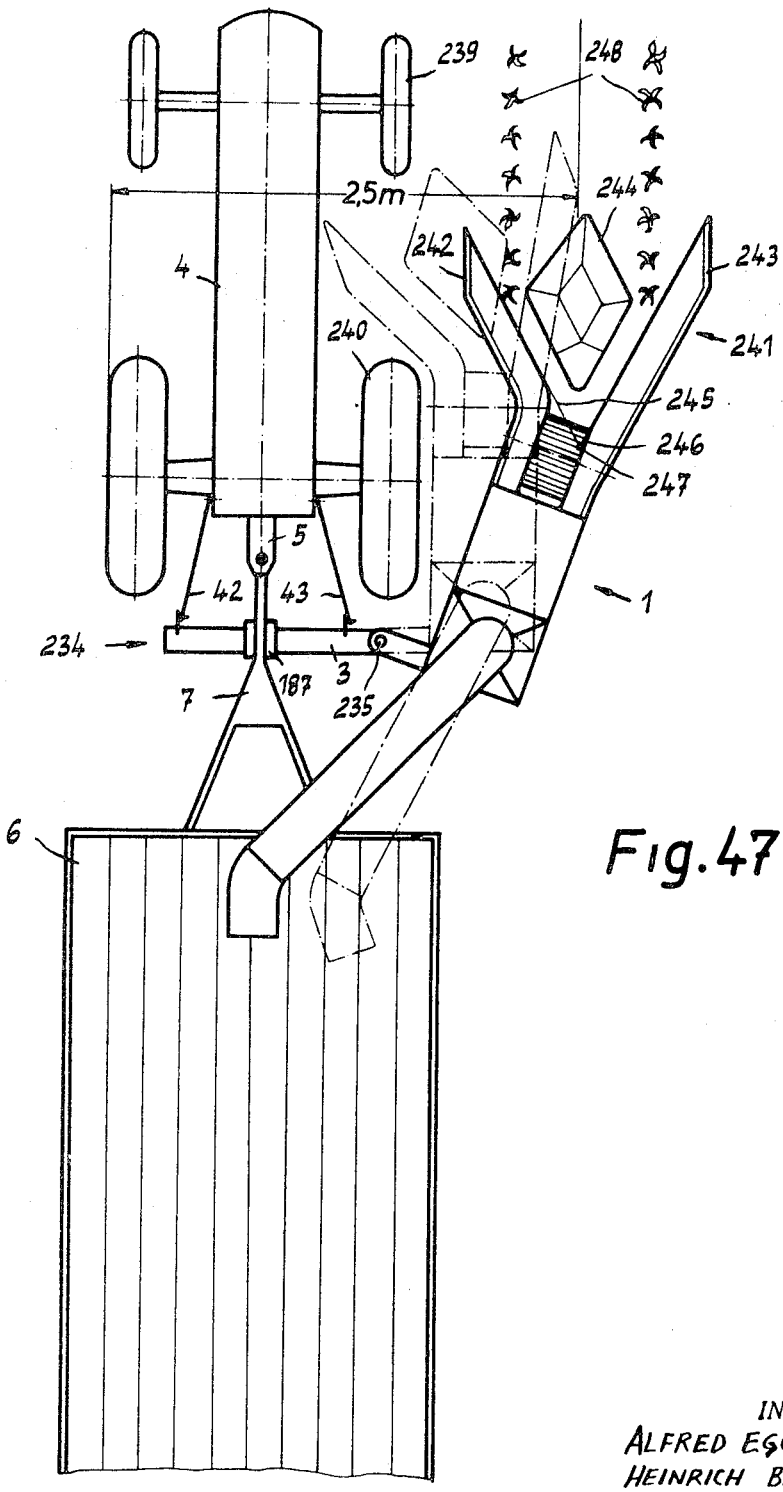
FIG. 47 shows a field chopper built to a tractor with double row cutting mechanism.

The frame of the field chopper 1 may also be of such design that the accommodation means can be removed and replaced by a double row cutting mechanism 242 as shown in FIG. 47. The double row cutting mechanism 241 comprises two outer sidewalls 242 and 243 where the outer retraction chains are positioned and a center part 244 located between both sidewalls where the inner retraction chains are arranged. With reference to the chopper apparatus 1 the sidewall 242 located on the tractor side is highly angled toward the tractor, while the other sidewall 243 which is directed away from the tractor extends toward the chopper 1 approximately rectilinearly to slightly angled outwardly.

The position of both sidewalls 242,243 in relation to each other is so selected that their extended median lines 245,246 intersect at a point 147 located approximately in the center between the plant rows 248 to be cut.

Due to the asymmetric design the double row cutting mechanism 241 is given the position oriented in driving direction, required for the operating relation to the chopper apparatus 1 arranged obliquely at the tractor 4, making possible the inward pivoting of the field chopper for transportation into the position shown in broken lines in FIG. 47, between the tractor wheels 239,240, without parts of the double row cutting mechanism 241 colliding with the rear tractor wheel 240.

Figure 48:
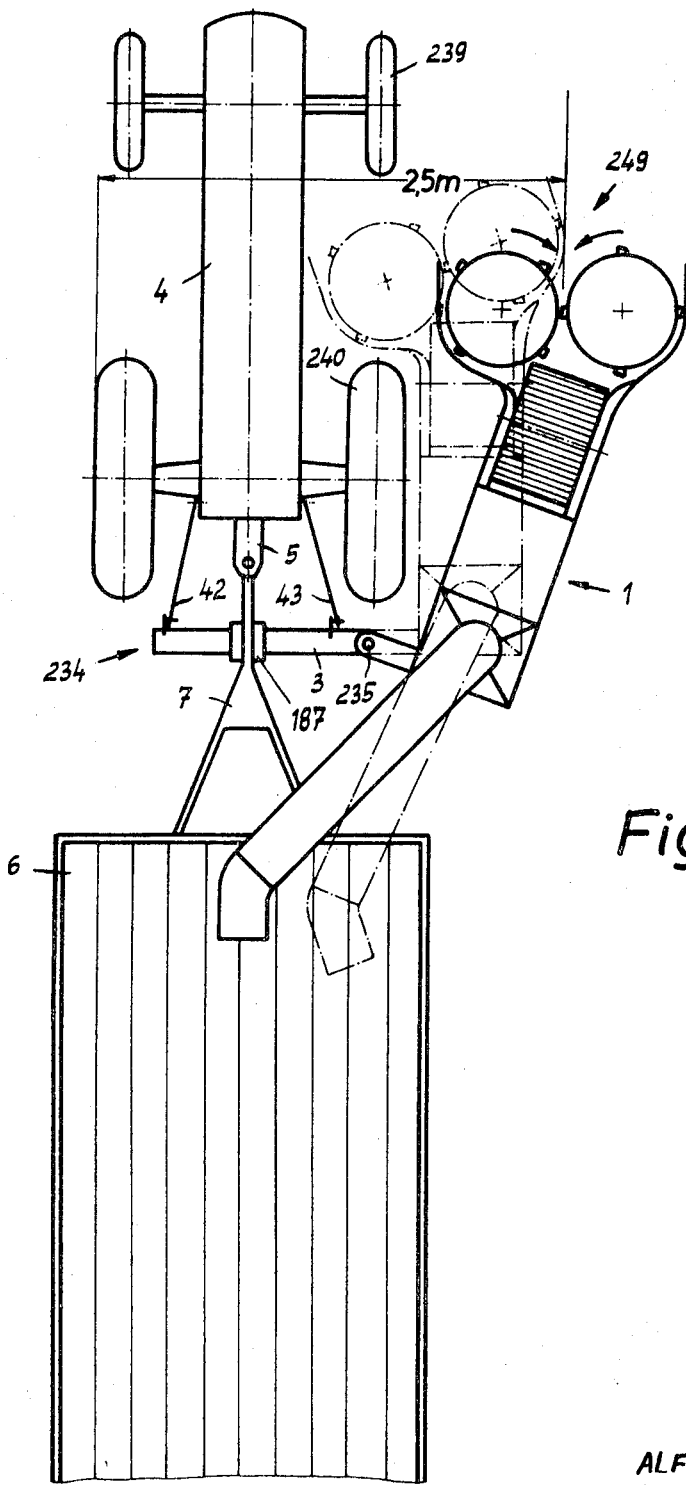
FIG. 48 shows a field chopper attached to the tractor with a circular mowing mechanism.

FIG. 48 shows a design where a circular mowing mechanism 249 is placed at the chopper apparatus 1. The circular mowing mechanism also has, as shown in the embodiments according to FIG. 46 with accommodation device and according to FIG. 47 with a double row cutting mechanism, an asymmetric position in relation to the obliquely positioned chopper 1, making possible an inward pivoting of the field chopper from the oblique position required for the operation to the vehicle width of 2.5 meters required for transportable position.

In order to adjust the attachment frame 234 in connection with the field chopper 1 to different tractor gauges, it may be advantageous to design the vertical pivoting shaft 235 which connects the field chopper with the attachment frame laterally displaceable. That way the field chopper 1 can be approached to the utmost dimension to the rear tractor wheel 240, in order to be given in transportable position with inwardly pivoted accessory as low a total vehicle width as possible which at low tractor gauge is below the maximum valve of 2.5 meters.

According to FIG. 49 the frame of the field chopper 1 is so designed that the row cutting mechanism may be dismantled and replaced by an accommodation apparatus 250.

Figure 51:
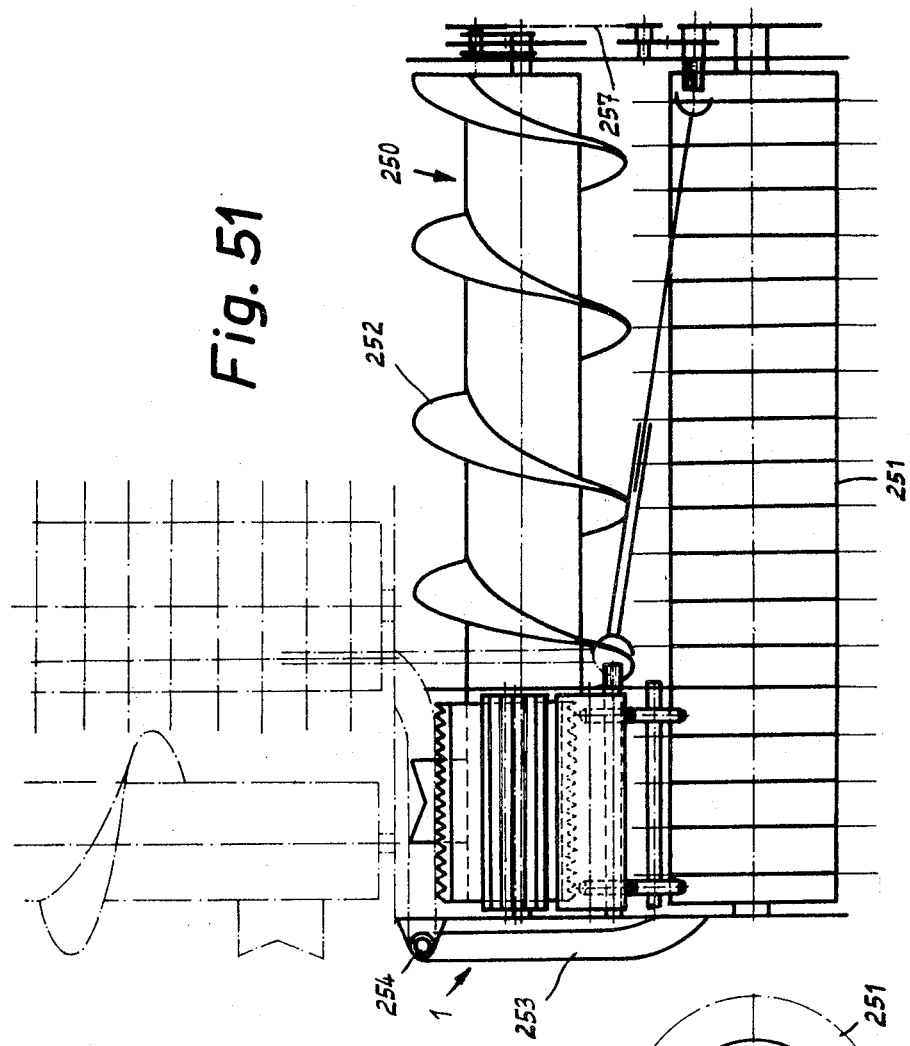
FIG. 51 shows the receiving apparatus from the rear
Figure 52:
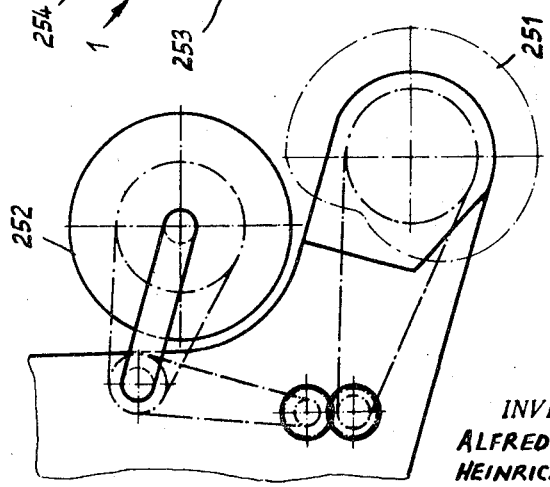
FIG. 52 shows the receiving apparatus from the side.

The accommodation apparatus 250 comprising in the main an accommodation drum 251 and a transverse conveyor worm gear 252 is positioned freely pivotable via an arm 253 (see FIG. 51) at the chopper 1 around a shaft 254 placed in driving direction and bears down on the ground with its outer end via a supporting wheel 255. For the transportation the accommodation apparatus may, thanks to this oscillating suspension, be pivoted upwardly around shaft 254 (accommodation apparatus 250, see FIGS. 50 and 51) so that again the total vehicle width of field chopper and tractor 4 will not exceed 2.5 meters at the most.

The drive of the accommodation drum 251 may be accomplished via a cardan shaft 256 from a shaft of the feeder means or the compression means of the chopper 1.

The transverse conveyor worm drive 252 is propelled from the accommodation drum 251 via a chain drive 257 or the like. In order to preclude damage and/or deformation of the accommodation device 250 or the cardan shaft 256 in cases of unintended connection of the chopper 1 when the accommodation apparatus is in upwardly pivoted position, the drive transmission can be designed so that it automatically disconnects by a clutch known from prior art or the like during the upward pivoting.

Figure 53:
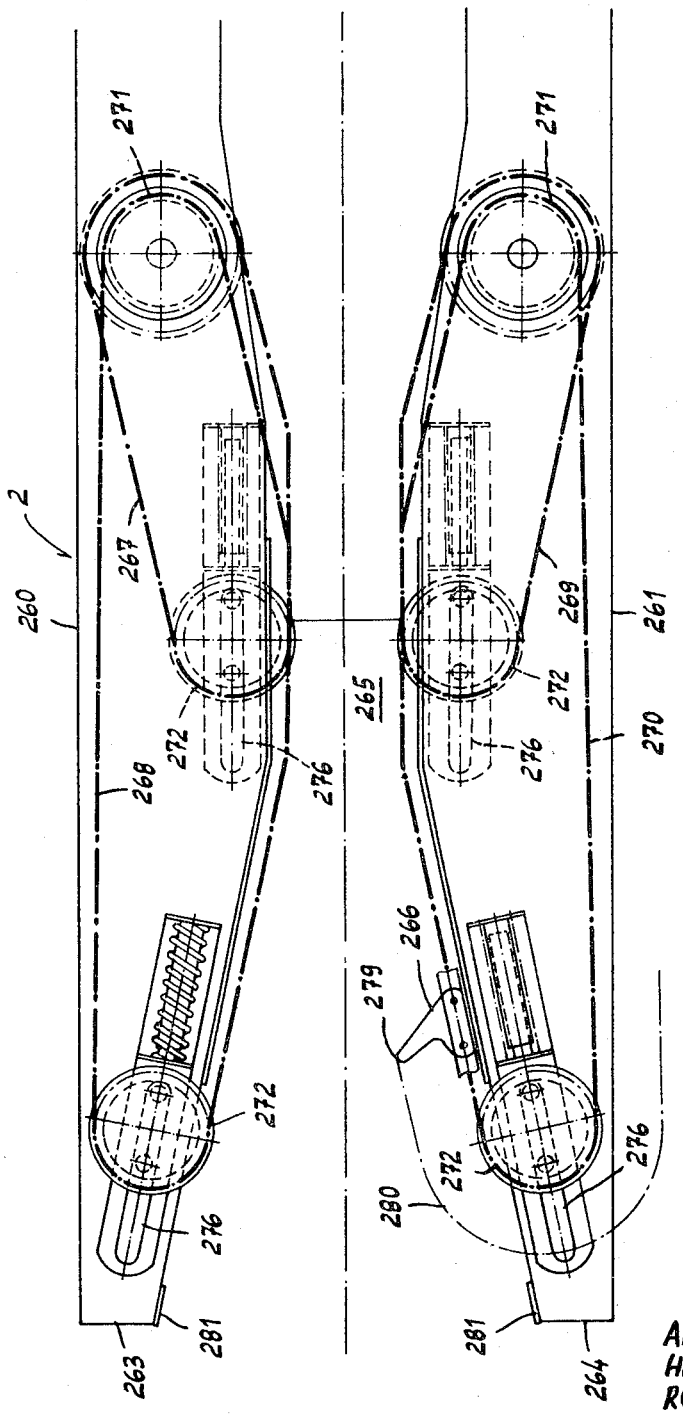
FIG. 53 shows a plan view upon a row cutting mechanism.

FIGS. 53 and 54 show a row cutting mechanism 2 comprising two side parts 260,261, which, viewed from the top have in their anterior area a generally triangular shape (FIG.53).

The lateral parts 260 and 261 are arranged at their front ends 263, and/or 264 at a wide distance from each other and converge rearwardly to a point from which they extend parallel to each other, in order to form an infeed passage 265 extending from the front to the rear. When the field chopper moves forward, the side parts 260 and 261 move on opposite of the upright cereal grains and they thus reach the passage 265 in order to be introduced into the chopper apparatus 1 adjacent thereto but no longer shown here.

In order to assure proper introduction of the cereal grains two superposed pull-in chains 267, 268, 269 and 270 provided with entrainment means are arranged at the side parts 260 and 261, whereby the lower pull-in chains 267 and 269 and the upper pull-in chains 268 and 270 cooperate in pairs. Each chain operates via two chain wheels 271 and 272, of which the chain wheel 271 is propelled and the chain wheel 272 is used as reversing wheel. The reversing wheel 272 is positioned rotatably on a bolt 273 which is fixedly connected to an angular guide part 274. The guide part 274 is connected displaceably by way of two holding bolts 275 which protrude thru a slot 276 provided in the side part 260 and/or 261 with the prevailing side part within the slot 276. In the proximity of the guide part 274, a counter bearing 277 is provided which is fixedly connected to he sides 260 and/or 261, against which a spring operating on the guide part 274 bears down.

With the pull-in chain placed on its corresponding chain wheels 271 and 272, the spring 278 is tensioned so far under displacement of the reversing wheel that by the effect of the spring 278 the pull-in chain is given the required operating tension.

A stop 281 is provided besides the reversing wheel 272 at a distance smaller than the circle 280 described by the entrainment tips 279 at relaxed spring 278 around the center of the reversing wheel 272. The front limitation of a perforation 282 in the side part 260 and/or 261 as provided for the passage of the lower pull-in chains 267 and/or 269 in the side part in may also replace the stop 281.

In the case of a rupture of the chain the spring 278 relaxes thereby displacing the guide part 274 with the reversing wheel 272 into the position 272' shown in FIG. 54 by dots and dashes. Thereby the entrainment means 266 of the pull-in chain come into the area of the stop 281 and/or 282, impact same so that the pull-in chain and the reversing wheel 272 assigned to it stops at that moment and cannot get thru the passage into the components of the chopper 1. The other end of the defective pull-in chain thereby rolls off from its corresponding drive chain wheel 271, which of course continues to rotate if the chain should break, and drops to the ground.

We claim:

1. Field chopping machine having at least one chopper attachable to a tractor to which a wagon is connected by pulling means including a traction pole, said chopper having an attachment frame which projects laterally over the tractor and supports a chaff-cutting device having pickup device, including means on the attachment frame for connecting same to the tractor such as to leave the pulling means freely accessible at all times, and means associated with the frame and the tractor for fastening the wagon to the tractor such as to assure maximal maneuverablility of the traction pole, the attachment frame comprising a crossbar, including means for positioning the pickup device horizontally when in operating position, means for pivoting the pickup device upwardly to a transport position, and means for locking same therein, telescopic means for lengthening the crossbar such as to form support means for lateral attachment of the field chopper to a tractor having a traction jaw, the crossbar extending from the frame to a point beyond the center of the tractor, clutch bolts mounted on the crossbar, lower guide rods, connected to the clutch bolts, and upward guide rod, and means for coupling the upper guide rod to the crossbar, wherein the means for coupling the upper guide rod comprise two braces fastened to the crossbar in an upright position to the tractor extending approximately to the traction jaw, a bow freely pivotably mounted on the braces and having a bearing eye slidably and lockably mounted thereon, said bearing eye capable of being connected to a point of attachment of the upper guide rod to the tractor.

2. Field chopper according to claim 1, wherein the pickup device and the chaff-cutting device form with feeding, pressing and cutting organs, a narrow, elongated structural unit, arranged in the longitudinal axis of the tractor, the pickup device and the chaff-cutting device being of about the same width and arranged laterally near the rear wheel of the tractor, the pickup device including a removable row cutting mechanism being arranged in front of the chaff-cutting device and projecting thereover, all organs of the row cutting mechanism and the chaff-cutter being positioned between two sidewalls forming a unit, the side walls being connected with each other at a distance which equals approximately the width of the organs and forming together a self-supporting frame for the field chopper.

3. Field chopper according to claim 1 wherein the sides of the bow facing the crossbar extend in a substantially horizontal direction, the sides facing the point of attachment on the tractor extend in a substantially vertical direction, and the last-mentioned sides being provided with a plurality of perforations.

4. Field chopper according to claim 1, wherein the center lines of the lower guide rods and the braces in a lowered position intersect at a point which is located behind the pivot points of the lower guide rods, the position and the distance of the point from the pivot points being selectable.

5. Field chopper according to claim 2, wherein the chaff-cutting device and the pickup device form a harvesting mechanism which is detachably connected to the attachment frame, and including a first supporting wheel mounted on the attachment frame for supporting the harvesting mechanism, the pickup device comprising a guide sprocket wheel freely slidable in chain-tension direction under the tension of a spring, and a stop provided near the guide sprocket wheel at a distance which is smaller than a circle described by catch hooks around the center of the guide sprocket wheel when the spring is untensioned.

6. Field chopper according to claim 5, wherein the harvesting mechanism comprises a drive shaft positioned ahead of the clutch bolts, and further including a miter gear having a universal shaft connecting pin disposed behind the clutch bolts.

7. Field chopper according to claim 6, wherein the miter gear comprises a drive shaft which is disposed in an approximately parallel staggered position relative to the drive shaft of the harvesting mechanism, the two drive shafts being connected by a first pair of spur wheels.

8. Field chopper according to claim 7, wherein the drive shaft of the miter gear is connected to the drive shaft of the harvesting mechanism through a universal-joint shaft.

9. Field chopper according to claim 6, wherein the miter gear includes an intermediate gear in the form of a second pair of spur wheels.

10. Field chopper according to claim 1, including a three point linkage comprising said lower guide rods and the upper guide rod, the attachment frame being connectable to said linkage and the attachment frame being disposed above the traction pole.

11. Field chopper according to claim 10, including an arm mounted to said crossbar, in an oblique downward direction outside of the rear wheel of the tractor, and drive-transmission means and connecting means for a harvesting mechanism being provided on said arm.

12. Field chopper according to claim 11, wherein the crossbar comprises coupling bolts for arranging the attachment frame below the traction pole, said clutch bolts constructed and adapted for arranging the attachment frame above the traction pole.

13. Field chopper according to claim 5, wherein there is provided on the harvesting mechanism in front of its center of gravity in the range of an extension of the tractor rear-wheel axle, a second supporting wheel which is pivotable by means of a hydraulic working cylinder, with the pressure side of the lifting cylinder of the tractor power lifter being connected with the working cylinder on the harvesting mechanism, so that pressure oil, whose pressure is generated by the weight of the lifted mechanism, may be transmitted at a selected moment from the lifting cylinder to the working cylinder.

14. Field chopper according to claim 5, including means for connecting the front end of the harvesting mechanism to lifting rods of a tractor mower, and means for adjusting the position and length of the connecting means between the lifting rods and the harvesting mechanism.

* * * * *